US006987535B1

(12) United States Patent
Matsugu et al.

(10) Patent No.: US 6,987,535 B1
(45) Date of Patent: Jan. 17, 2006

(54) IMAGE PROCESSING APPARATUS, IMAGE PROCESSING METHOD, AND STORAGE MEDIUM

(75) Inventors: Masakazu Matsugu, Chiba (JP); Toshiaki Kondo, Shingapore (SG); Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/435,774

(22) Filed: Nov. 8, 1999

(30) Foreign Application Priority Data

Nov. 9, 1998 (JP) .................................. 10-318141
Jan. 6, 1999 (JP) .................................. 11-001104

(51) Int. Cl.
*H04N 5/262* (2006.01)
(52) U.S. Cl. ........................... 348/239; 348/586
(58) Field of Classification Search ............. 348/218.1, 348/231.99, 239, 586, 587
See application file for complete search history.

(56) References Cited

U.S. PATENT DOCUMENTS

| 5,477,264 | A | * | 12/1995 | Sarbadhikari et al. ... 348/231.6 |
| 5,731,849 | A | | 3/1998 | Kondo et al. |
| 6,052,648 | A | * | 4/2000 | Burfeind et al. ................ 702/3 |
| 6,137,919 | A | * | 10/2000 | Gonsalves et al. ........... 382/284 |
| 6,301,382 | B1 | * | 10/2001 | Smith et al. ................. 382/162 |
| 6,348,953 | B1 | * | 2/2002 | Rybczynski ................. 348/584 |
| 6,356,339 | B1 | * | 3/2002 | Enomoto ....................... 355/40 |
| 6,366,316 | B1 | * | 4/2002 | Parulski et al. ............. 348/239 |
| 6,404,936 | B1 | * | 6/2002 | Katayama et al. ........... 382/283 |
| 6,441,864 | B1 | * | 8/2002 | Minami et al. .............. 348/584 |
| 6,483,540 | B1 | * | 11/2002 | Akasawa et al. ............ 348/239 |
| 6,509,935 | B1 | * | 1/2003 | Busby et al. ................ 348/592 |
| 6,587,599 | B1 | * | 7/2003 | Huang ......................... 382/284 |

FOREIGN PATENT DOCUMENTS

JP          7-320086        12/1995
JP          9-185719        7/1997

OTHER PUBLICATIONS

"Snakes: Active Contour Models", M. Kass, et al., International Journal of Computer Vision, pp 321-331, 1988.
"Region-Based Strategies for Active Contour Models", R. Ronfard, International Journal of Computer Vision, pp 299-251, 1994.

* cited by examiner

*Primary Examiner*—Wendy R. Garber
*Assistant Examiner*—Jacqueline Wilson
(74) *Attorney, Agent, or Firm*—Fitzpatrick, Cella, Harper & Scinto

(57) ABSTRACT

A user photographs an image including an object to be extracted, uses an instruction selection unit or the like to designate an extraction range, and an object extraction circuit performs extraction. The image data of an extracted object area is compressed/encoded, and stored together with photographing conditions into a storage unit. Subsequently, a background image is photographed or inputted. While the background image is displayed, the previously extracted object image is read from the storage unit. To suppress a difference in gradation and hue between the background image and the object image, the gradation and hue of the object image are adjusted, mixing and smoothing with the background image are performed in the vicinity of an object outline, and the object image is overwritten, synthesized, and displayed on the background image. The position and size of the object image are adjusted according to a user's instruction. Synthesized image data is recorded in a recording medium.

24 Claims, 22 Drawing Sheets

FIG. 17

| ITEM | DATA FORM |
|---|---|
| IMAGE DATA FILE NAME | 16 BIT CHARACTER |
| PRESENCE/ ABSENCE OF CONVERSION PHOTOGRAPHING | INTEGER NUMBER "0" OR "1" |
| CONVERSION PHOTOGRAPHING MODE | 1 : RED EYE CORRECTION<br>2 : HAIR STYLE CONVERSION<br>3 : BEARD REMOVAL<br>4 : BEARD ADDITION<br>5 : FACE TYPE CONVERSION<br>6 : COMPOSITE SKETCH<br>7 : STAIN/FRECKLE REMOVAL |
| OUTLINE STYLE OF CONVERSION PART | INTEGER NUMBER<br>X1, Y1, X2, Y2 ⋯ |
| CONVERSION MODEL IMAGE DATA (HAIR, BEARD, FACE TYPE AND SO ON) | 24 BIT COLOR, BIT MAP FORMAT |

BEFORE CONVERSION
ASSISTANCE OUTLINE

AFTER CONVERSION
GAP AREA WITH BACKGROUND

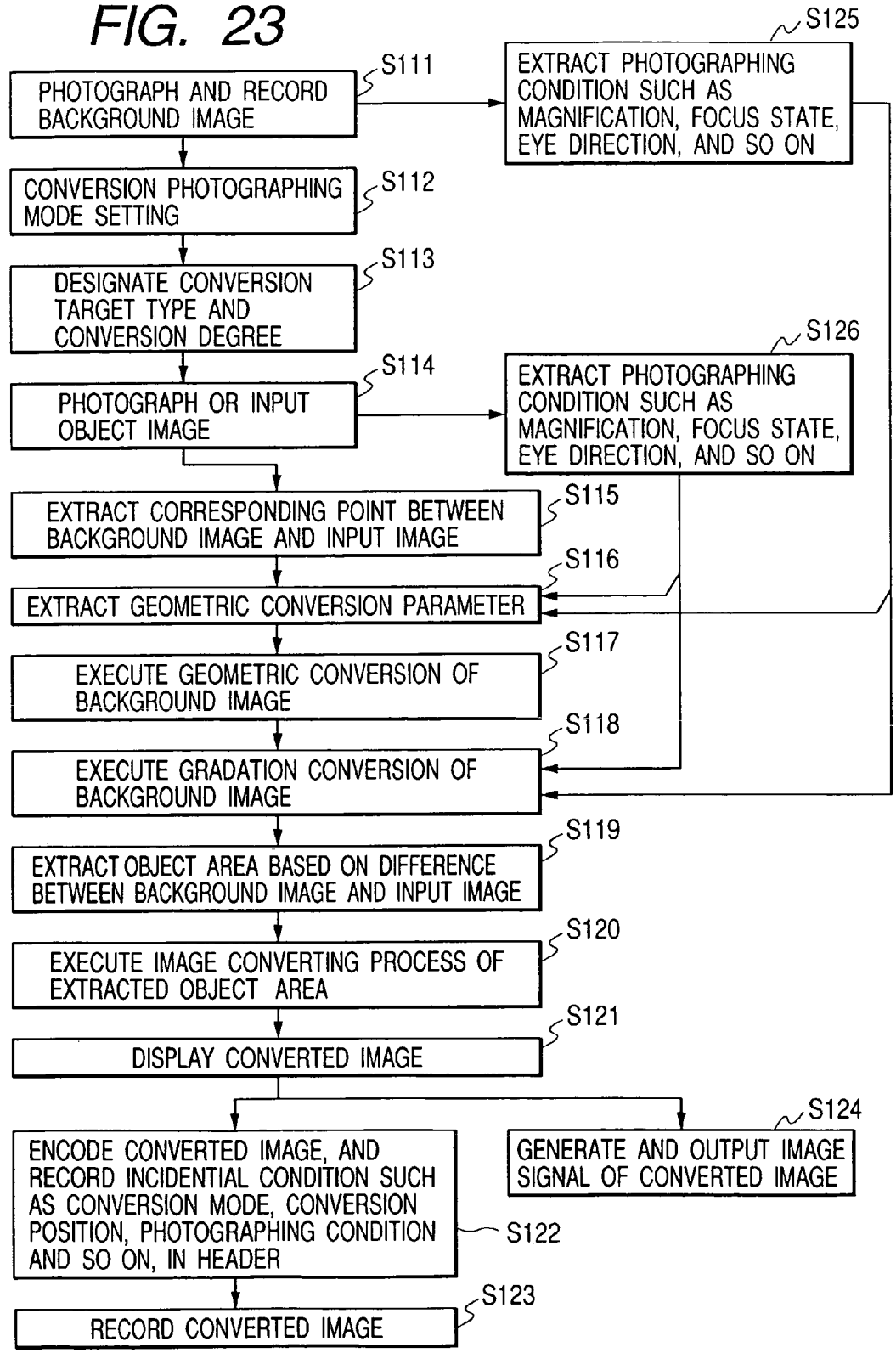

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method and a storage medium.

2. Related Background Art

In a conventional image pickup apparatus, as the freedom degree of an image information processing is enhanced with the digitizing of a signal processing, there have been proposed various apparatuses which perform, in the apparatuses, relatively simple processings such as conversion of luminance level or hue, color balance adjustment and quantized size conversion and which are additionally provided with image processing functions such as an edge extracting function and an object extracting function using a successive growth method of color components.

Moreover, a known method of extracting the image based on a difference from a background image comprises controlling an exposure amount so that an average luminance becomes adequate during background image pickup, using the same set value as that of the background image to photograph an original image, and extracting an object image based on difference data.

As techniques of transmitting or photographing the image by applying different processings to a specific area and other areas of an input image, the following techniques are known. For example, in a known technique, there is provided an extraction unit of the specific object area, and image data of the specific object area such as people and image data of a background portion taken from the input image are allowed to differ from each other in encoding properties or transmission properties (including the presence/absence of transmission of the specific area).

Moreover, an image transmission apparatus provided with a unit for cutting a plurality of areas from an image and synthesizing the areas in an arbitrary arrangement, or an apparatus comprising an object extraction unit, an image processing parameter control unit of an object and a background, or a processing circuit, and a replacing circuit are known.

For the conventional image processing apparatus provided with the object extracting function, since its object is to separate/extract an object under specific photographing conditions, it is disadvantageously difficult to extract the object in a usual background. Additionally, when image edition processings such as synthesis of the image with a separately prepared background are performed, the following problem occurs. Specifically, it cannot be judged during photographing whether the posture of the separated/extracted object matches the composition of the background image. This cannot be judged until the images are synthesized. Moreover, if the background image separately prepared by a user and the extracted object image are different from each other in photographing conditions such as lighting conditions, exposure conditions, magnification and focus state, the synthesized image becomes very unnatural and provides a feeling of difference. Therefore, processings such as hue conversion and gradation correction need to be sometimes added.

SUMMARY OF THE INVENTION

An object of the present invention is to provide an image processing apparatus, an image processing method, and a storage medium to solve the above-described problems.

To achieve the above object, according to the present invention, there is provided a preferred embodiment which comprises an image input unit including an image formation optical system, a photoelectric converting unit, an image signal processing unit, a storage unit and a control signal generating unit; an instruction selection unit for instructing/selecting a specific portion of an inputted image; an image processing unit; an image encoding unit; an image recording unit; an image recording medium; and an image display unit. The image processing unit comprises a specific object extraction unit for using image information of the portion indicated/selected by the instruction selection unit in the inputted image to extract a specific object in the image; and a synthesized image generating unit for synthesizing a background image stored in the storage unit or the image recording medium and the extracted specific object.

The present invention relates to an image processing apparatus provided with novel functions, an image processing method, and a storage medium.

Further functions and characteristics of the present invention will be apparent from the following drawings, and embodiments.

BRIEF DESCRIPTION OF THE DRAWINGS

FIG. 17 shows an image recording format representing example in the third embodiment.

FIG. 23 is still another flowchart of the image conversion processing.

DETAILED DESCRIPTION OF THE PREFERRED EMBODIMENTS

Embodiments of the present invention will be described hereinafter in detail with reference to the drawings.

Figure 1:
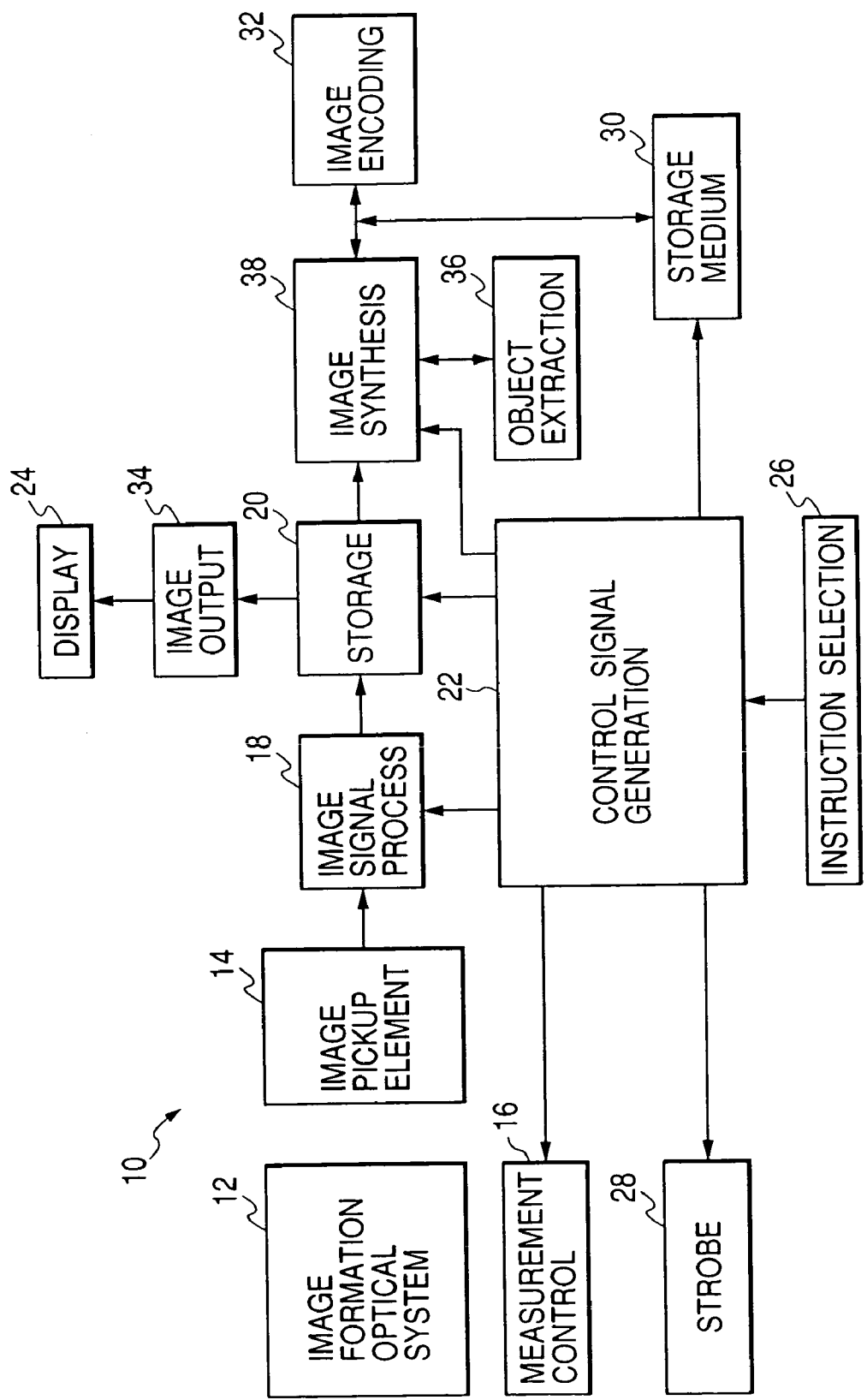
FIG. 1 is a schematic constitution block diagram of a first embodiment of the present invention.

FIG. 1 is a schematic constitution block diagram of a first embodiment of the present invention. A photographing image processing apparatus 10 comprises an image formation optical system 12 including a photographing lens and a zoom photographing drive control mechanism; an image pickup element 14 such as CCD image sensor; a measurement control circuit 16 for measuring and controlling image pickup parameters; an image signal processing circuit 18; a storage unit 20; a control signal generation circuit 22 for controlling an image pickup operation and image pickup conditions, and generating control signals of an image processing and image output; a display 24 serving also as finders such as EVF (electronic view finder); an instruction selection unit 26 comprising a pen type key, a cross key, and the like; a strobe emission unit 28; a storage medium 30; an image encoding circuit 32; an image output circuit 34; an object extraction circuit 36; and an image synthesis circuit 38.

The measurement control circuit 16 comprises a magnification detection circuit for detecting the magnification of a zoom lens whose photographing magnification can be changed; a focusing state detection circuit for detecting the focusing state on the image pickup surface of the image pickup element 14; an exposure amount control circuit for controlling the charge accumulation time of the image pickup element 14 and/or the diaphragm aperture diameter of the image formation optical system 12; a strobe emission control circuit; and a control signal generation circuit for generating the control signals of image signal properties such as gamma property, knee property and color balance. Some of these components are realized by software. The image pickup parameters include the photographing magnification, focus state and exposure amount, additionally an eye direction, the presence/absence of strobe emission, and types of lighting light (e.g., sunlight, fluorescent lamp, incandescent lamp, strobe light, and the like). The eye direction is detected by a sight line detection unit (not shown) incorporated in the image signal processing circuit 18.

The image signal processing circuit 18 has a correction circuit of gamma, knee, white balance, and the like, an auto-focus (AF) circuit, an automatic exposure (AE) control circuit, an automatic gain control (AGC) circuit, and the like.

The instruction selection unit 26 comprises the pen type key and/or the cross key, and the like. On the other hand, a touch panel is integrally formed on the display 24. When an operation panel is displayed on the screen of the display 24, the displayed operation panel forms one mode of the instruction selection unit 26.

The storage medium 30 comprises disk media such as a magnetic tape, an optical disk and an optomagnetic disk, and various media such as a flash memory and an IC memory. In the embodiment, the storage medium 30 is not especially limited. The storage medium 30 is detachably attachable to the photographing image processing apparatus 10.

The image encoding circuit 32 compresses/encodes image data together with incidental data such as the photographing conditions obtained from the above-described measurement control circuit 16 in a predetermined format.

An extracting process of an object and a synthesizing process with a background image, which are characteristic operations of the embodiment, will be described with reference to FIG. 2.

The user photographs an image including an object to be extracted (S1), and uses the instruction selection unit 26, and the like to extract an image of an area where the object is present by the object extraction circuit 36 (S2, S3). For example, the operation comprises instructing some points on the outline of the object of the input image displayed on the display 24 by the instruction selection unit 26, and sets a reference point for extracting the object in the object extraction circuit 36. The object extraction circuit 36 executes an edge tracing by connecting adjacent reference points in a predetermined method, and obtains the outline of the object as one closed curve. Edge data can be obtained with respect to the input image by known methods, for example, a space differential filtering processing such as SOBEL and Laplacian. The image of the area inside the closed curve obtained in this manner can be extracted as the object image (S3). The method of extracting the closed curve corresponding to the object outline is not limited to the above-described method.

The extracted image data of the object area is compressed/encoded in a predetermined compression system (e.g., a compression encoding system using Wavelet conversion and DCT conversion), and stored to the storage unit 20 together with the photographing conditions such as the photographing magnification and exposure conditions (the charge accumulation time of the image pickup element 14 and the presence/absence of strobe emission in the strobe emission unit 28) in a predetermined format (S4).

Subsequently, the background image is photographed or inputted (S5). While the background image is displayed on the screen of the display 24, the object image extracted beforehand is read from the storage unit 20 or the storage medium 30 (S6). To suppress the difference in gradation and hue by the difference in the photographing condition between the background image and the object image, a correction processing of the gradation and hue of the object image is performed (S7), and the mixing and smoothing with the background image in the vicinity of the object outline are performed. The object image is synthesized to be overwritten onto the background image, and displayed on the screen of the display 24 (S8). To raise the display speed of the display 24, the correction processing dependent on the photographing condition may be performed during the recording of the synthesized image.

Figure 3:
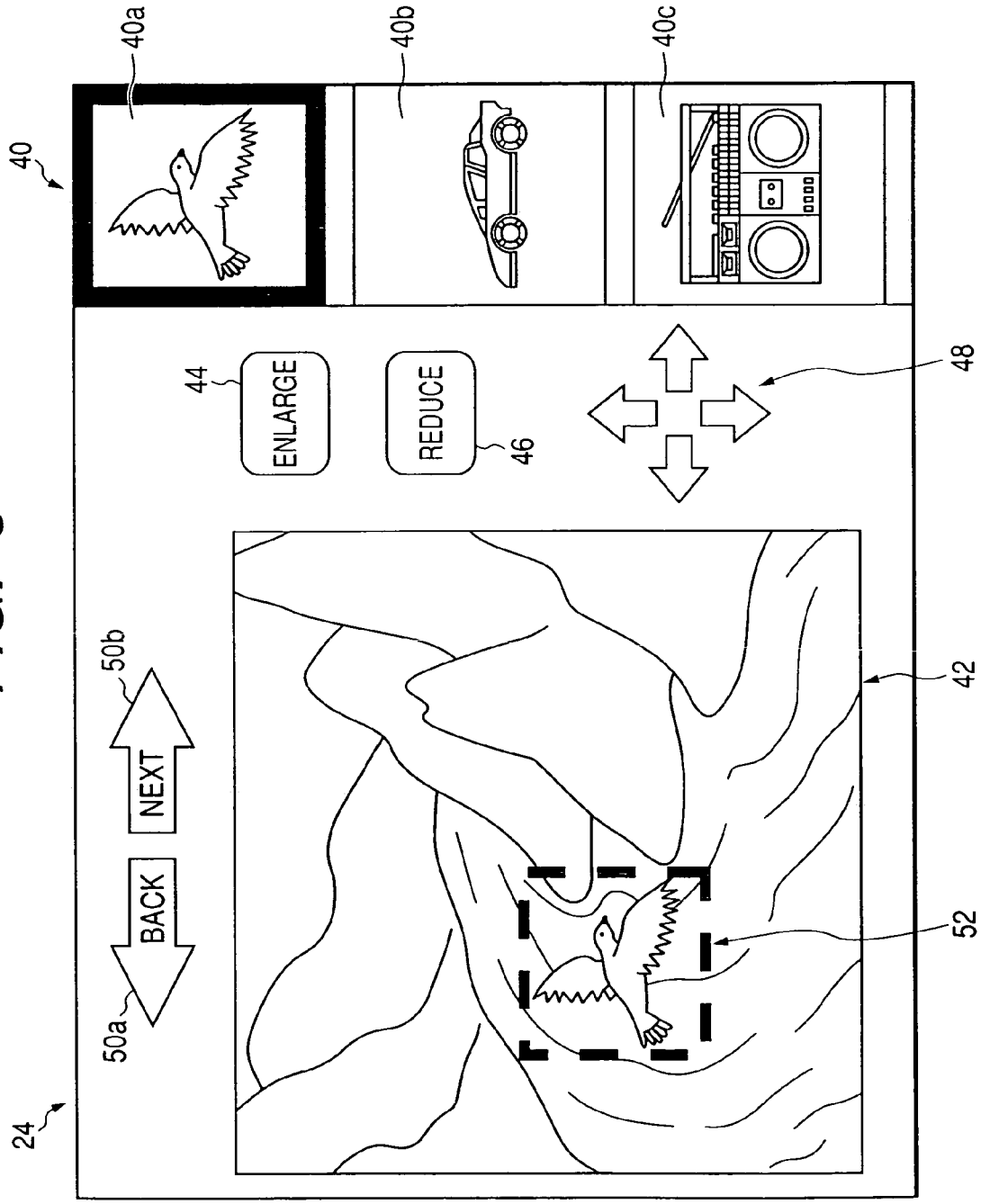
FIG. 3 shows an example of a display screen of a display 24.

FIG. 3 shows a display screen example of the display 24. Displayed on the display 24 are object image display areas 40a, 40b, 40c displaying three object images obtained as extraction processing results, a synthesized image display area 42, an enlarge button 44 for instructing enlarged display, a reduce button 46 for instructing reduced display, a movement key 48 for instructing vertical and horizontal movements, a back key 50a for instructing the returning to the previous processing, and a next key 50b for instructing the shifting to the next processing.

Figure 4:
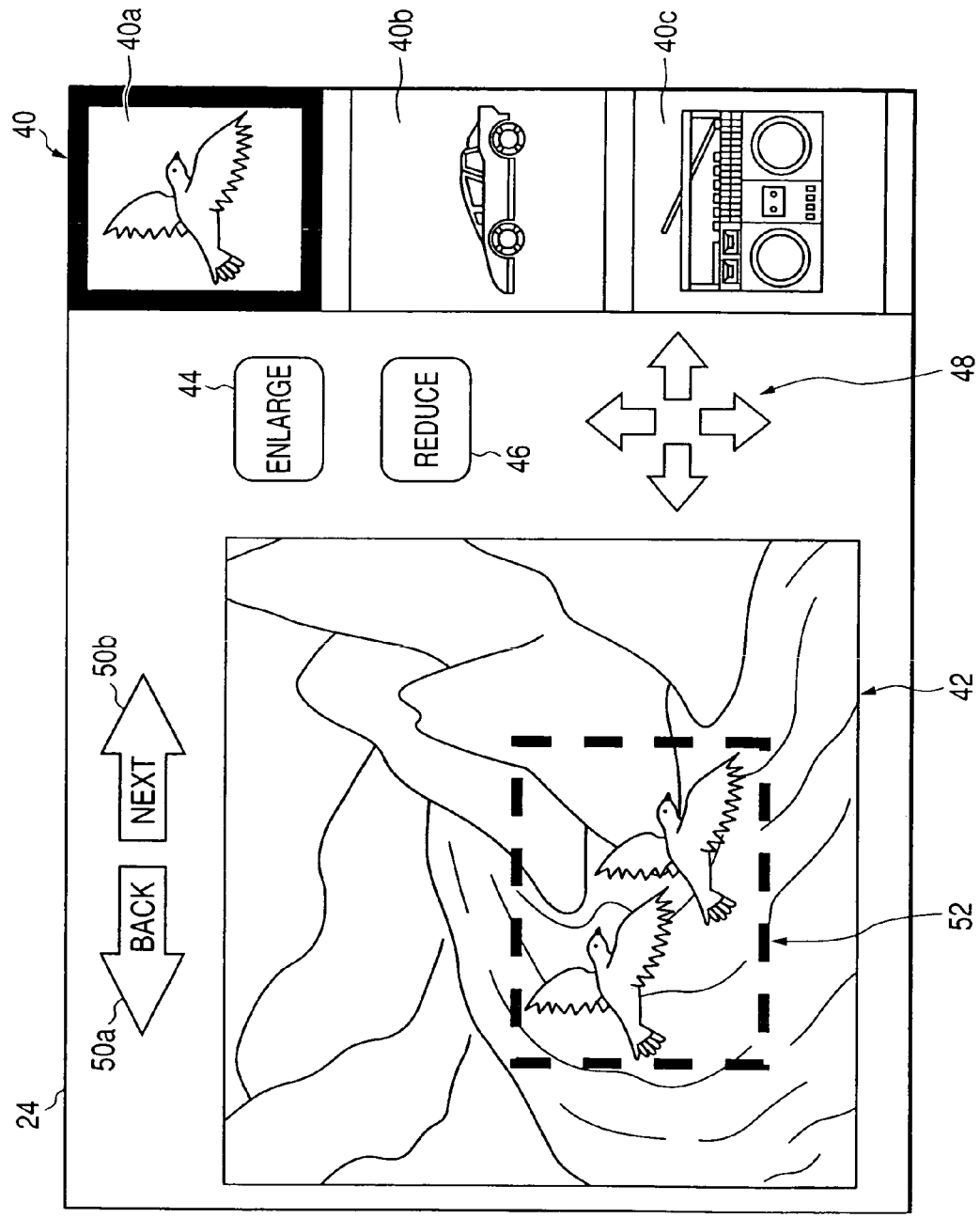
FIG. 4 shows a synthesis example in which the same object image is added slightly apart.

According to the user's instruction, the position and size of the object image are adjusted (S9). At this time, an auxiliary frame 52 roughly representing the size and position of the object is displayed to surround the object image on the synthesized image. The selected object image (the image displayed in the object image display area 40a in FIG. 3) is emphasized/displayed by a bold frame so that it can be recognized. Such representation method is known. FIG. 4 further shows a synthesis example in which the same object image is added slightly apart. Since the object image is enlarged as a result, the auxiliary frame 52 indicating the position and size of the object image is larger than that in FIG. 3.

The user can operate the enlarge button 44, the reduce button 46 and the movement key 48 for changing the position with a touch pen, a mouse or a finger to change the size and position of the object image. A graphical user interface itself using these buttons is known. It goes without saying that such operation buttons, and the like may be set in predetermined positions on an apparatus main body surface. The user can return to the previous processing stage by the back key 50a, and shift to the next processing sage by the next key 50b.

As a result of the adjustment of the size and position of the extracted object image, when the user judges that the image has an appropriate arrangement and size in the background image, and pushes a synthesis recording button on the operation panel, the synthesized image data (of course, excluding the auxiliary frame 52) is compressed/encoded and recorded in the storage unit 20 or the storage medium 30 (S10). During the recording, the photographing condition used for generating the synthesized image is encoded as incidental information, and may be recorded in the header section of an image data file, and the like. In addition to the photographing condition, the incidental information may include the coordinate of each point on the outline of the object part during synthesis recording, the gravity center position and vertical/horizontal size of a rectangular frame (e.g., the auxiliary frame 52 of FIG. 3) abutting on the outline from the outside, the gravity center position of an ellipse abutting on the outline from the outside, and parameters such as the size and direction of a major axis and an ellipticity.

The incidental information regarding the shape, position and size of the object can be read separately from the synthesized image in the subsequent photographing, and overlapped as auxiliary data with the displayed image on the display 24. Therefore, in a series of processing performed on the same type of the object from the object extraction to the synthesis with the background, a trouble necessary for the object extraction can be saved.

Figure 5:
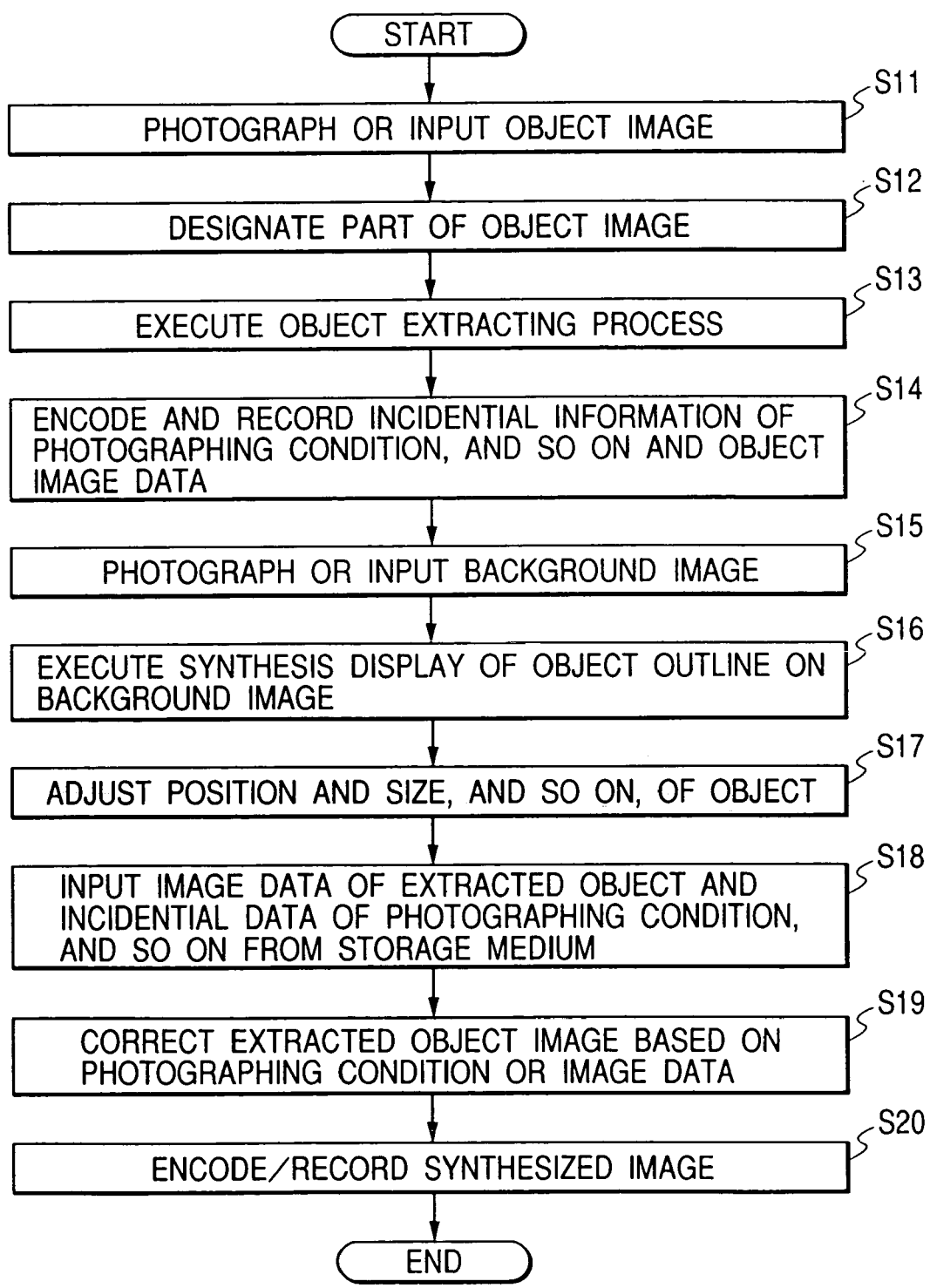
FIG. 5 is a flowchart of another synthesis processing of the embodiment.

FIG. 5 is a flowchart showing a modification comprising first superimposing/displaying the outline of the extracted object image on the background image, adjusting the position and size of the object image, and synthesizing the object image. Steps S11 to S15 are the same as the steps S1 to S5 of the flowchart of FIG. 2. The outline of the extracted object image is superimposed/displayed on the background image (S16), and the position and size of the object image are adjusted (S17). Subsequently, the extracted object image data and incidental information data stored in the storage unit are inputted, the object image is synthesized with the background image so that the object image enters the outline (S18), the gradation and hue of the object image are corrected in accordance with the photographing condition (S19), and the synthesized image is recorded in the storage medium 30 (S20).

Additionally, when the background image is substantially the same as the background in the object image before the extraction processing is performed, and even when the image area to be extracted includes the background part in the object image to some degrees, no problem other than the fluctuation generated by factors such as the difference of the photographing condition occurs during the synthesis. Therefore, in this case, needless to say, the object roughly including the background may be extracted for use with the rectangular frame, the ellipse, and the like as described above.

Figure 6:
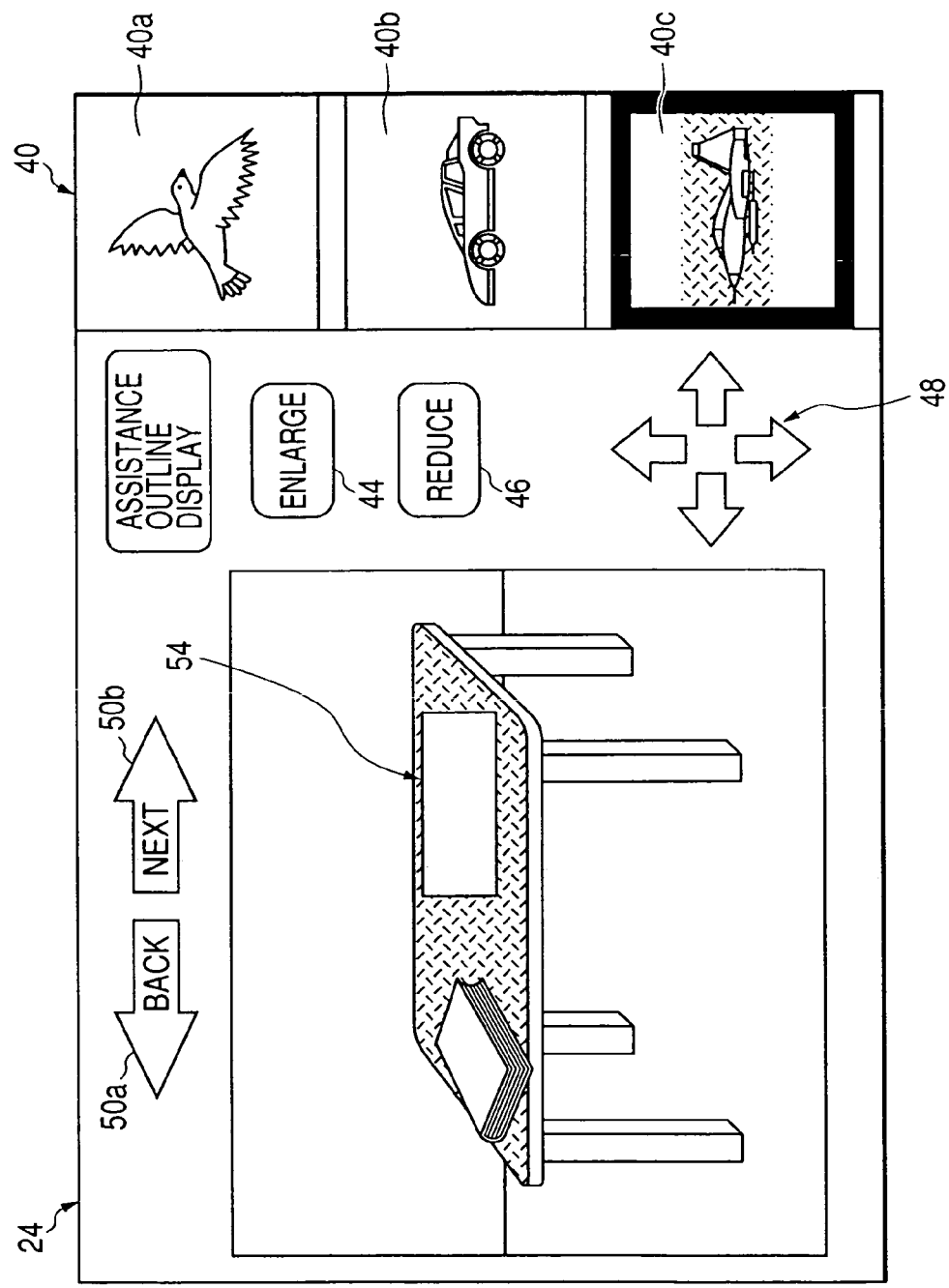
FIG. 6 shows another screen example of the embodiment.

Therefore, the image obtained by removing an unnecessary person or object by the object extraction processing during the photographing, that is, the image lacking in a certain area as shown in FIG. 6 is used as a first image. Subsequently, the background image is photographed, the area of the background image corresponding to the inside of a rectangular frame 54 of the first image is automatically extracted, and the first image may be synthesized to refill the removed image area of the background part. The object image 40c of FIG. 6 is obtained by extracting the image inside the rectangular frame 54. Also in this case, the synthesis result is displayed on the display unit, and the synthesis result image is encoded and recorded to the predetermined recording medium according to the user's instruction. An assistance outline indicates the outline of the lacking image of FIG. 6.

Figure 7:
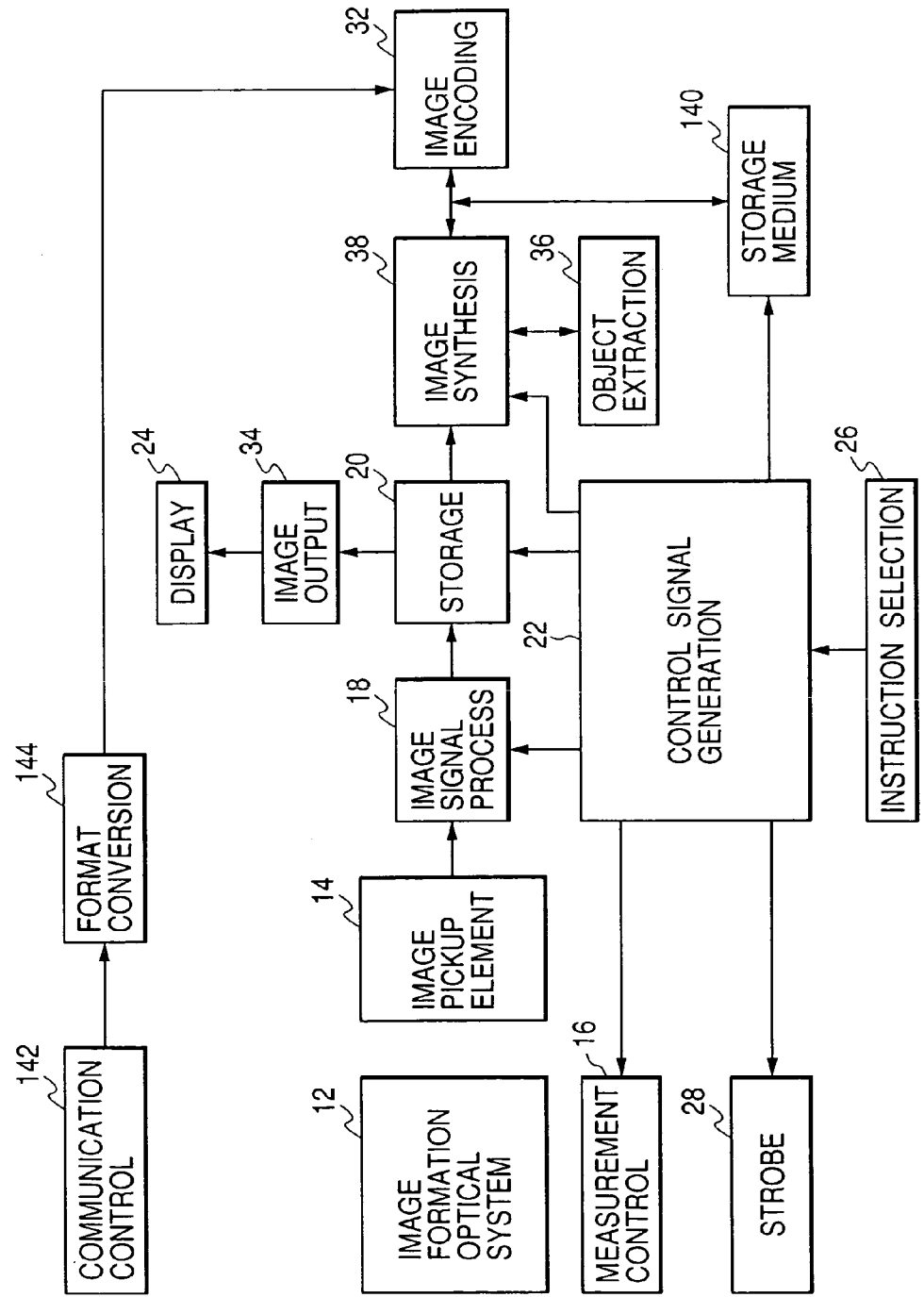
FIG. 7 is a schematic constitution block diagram of a second embodiment of the present invention.

A second embodiment of the present invention will next be described. In the second embodiment, an image prepared beforehand (first image: irrespective of a dynamic or still image) is taken via a recording medium detachably attachable to a main body, a communication unit, or the like, and synthesized with an image (second image: irrespective of the dynamic or still image) photographed on the spot). The resulting synthesized image is recorded in the recording medium of the main body or a storage apparatus, or outputted to the outside. FIG. 7 shows a schematic constitution block diagram of the embodiment. The same constituting elements as those of FIG. 1 are denoted by the same reference numerals. Numeral 140 denotes an attachable/detachable recording medium, 142 denotes a communication control circuit, and 144 denotes an image data format conversion circuit. The image data format conversion circuit 144 converts image data of various formats inputted via the communication control circuit 142, and the like in a predetermined internal form. When the image data is outputted to the outside via the communication control circuit 142, it is converted to a predetermined external form from the internal form.

In the embodiment, when the first image is an object image on which cutting has already been performed, and after the first image is inputted, the first image is synthesized with a second image (background image) without performing the above-described object extraction processing. Additionally, the second image may be subjected to the object extraction processing, and synthesized with the first image.

The mode and type of the image inputted from the outside via the communication control circuit 142 are varied, and include, for example, a TV or video image, a document image or a photograph image in the form of a file transmitted from an external terminal via a telephone channel, and image data transmitted from other image input apparatuses (e.g., a digital camera, a scanner, and FAX) in a wireless or wired manner, and are not limited in the embodiment, but the data form is known. Similarly, the type of the image data recorded in the recording medium 140 is not limited as long as its format is known.

In the embodiment, data forms which can be inputted are predetermined, and the user selects from the forms. Specifically, the encoded image data is handled as the input data form, the type is determined (automatic determination or manual determination by the user) during input, and it is recognized whether the data is an image signal subjected to coding such as DPCM, or a predetermined coded file form. For the image signal, the image data subjected to run length coding such as DPCM coding or MR (modified read) can be inputted. For the file form, the forms for animation such as MPEG and Quick Time (trademark of U.S. Apple Computer, Inc.), bit map forms such as JPEG, TIFF, BMP/DIB, GIF, PICT and PCX, three-dimensional scene description forms for rendering application such as RIB, incorporating bit image forms with printer data stream represented by PCL, other plotting data forms such as PPT, and spread sheet image forms such as XLS can be inputted.

The image data inputted from the communication control circuit 142 is decoded, and subjected to error correction. Subsequently, if necessary, the conversion circuit 144 converts the format to a constant form (the bit map forms such as TIFF, BMP/DIB and JPEG are representative) fit for an internal image processing.

When the first image is a dynamic image, and the object extracted from one frame of the dynamic image is synthesized with the second image (background image), one frame selected by the user is converted to the data form of the still image.

When the first image is the dynamic image from which the object is extracted, and the second image is also in the dynamic image form, the image processing unit inside the main body comprises a key signal generation circuit and a synthesis circuit. A key signal is generated with respect to the object area in the first image, and the object image (foreground) and background image may be synthesized while they remain dynamic images.

Figure 8:
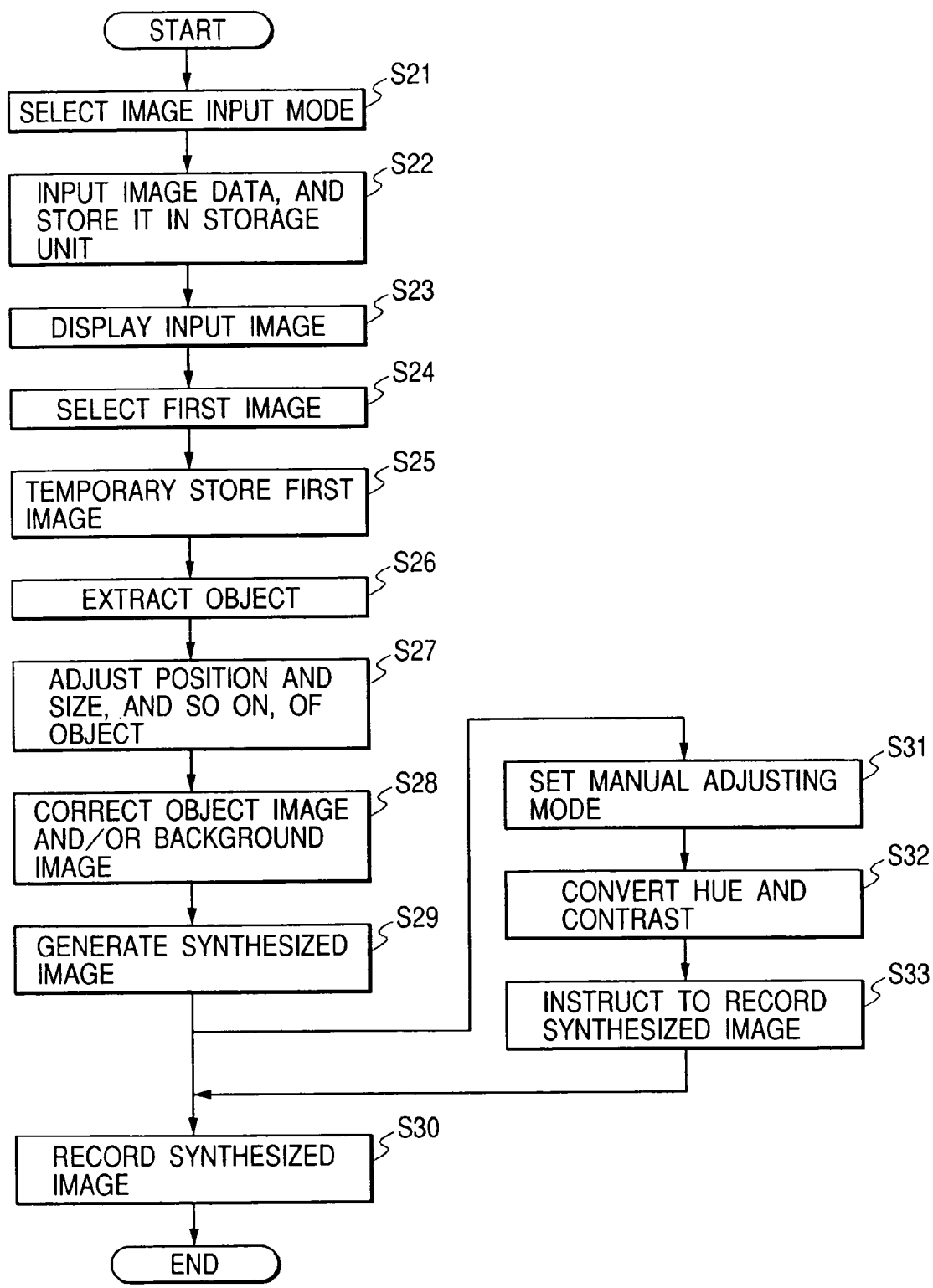
FIG. 8 is an operation flowchart of the embodiment shown in FIG. 7.

The operation and processing procedure of the embodiment shown in FIG. 7 will be described with reference to FIG. 8. First, the user selects one of three types of photographing input, communication input and medium input as the image input mode of the first image (S21), stores the image inputted in the designated image input mode to the storage unit 20 (S22), and displays the image on the display 24 (S23). In the communication input, after the communication mode or source is designated, the image data is inputted for a given time or for a given number of frames by a predetermined protocol or communication method, stored in the storage unit 20, and displayed on the display 24. In the medium input, after displaying a list of the images recorded in the recording medium 140, one or a plurality of desired images are selected from the list and read into the storage unit 20. In the photographing input, the photographed image is displayed/selected in the same manner.

The user appropriately selects one image frame or a series of dynamic image frames from the images displayed on the display 24 (S24), and stores the first image to the storage unit 20 (S25).

When the first image is not subjected to the object extraction processing, the user uses the instruction selection unit 26 to designate the object image to be extracted from the first image, and the object extraction circuit 36 extracts the object image by the processing similar to the processing of the above-described first embodiment (S26). Subsequently, the position and size of the object image with respect to the background image are adjusted (S27). In this case, the overlapping and displaying of the object image on the background image, or the overlapping and displaying of only the outline of the object image on the background image to prevent display speed to the display 24 from being lowered is designated. The designating unit may be similar to the unit of the above-described first embodiment.

When the photographing condition is attached to the object image and/or the background image as the incidental information, the gradation, hue, and the like of one image are converted based on the difference of the photographing condition to substantially agree with those of the other image in the same manner as in the first embodiment (S28). The synthesized image is generated (S29), and recorded in the recording medium 140 (S30).

Figure 9:
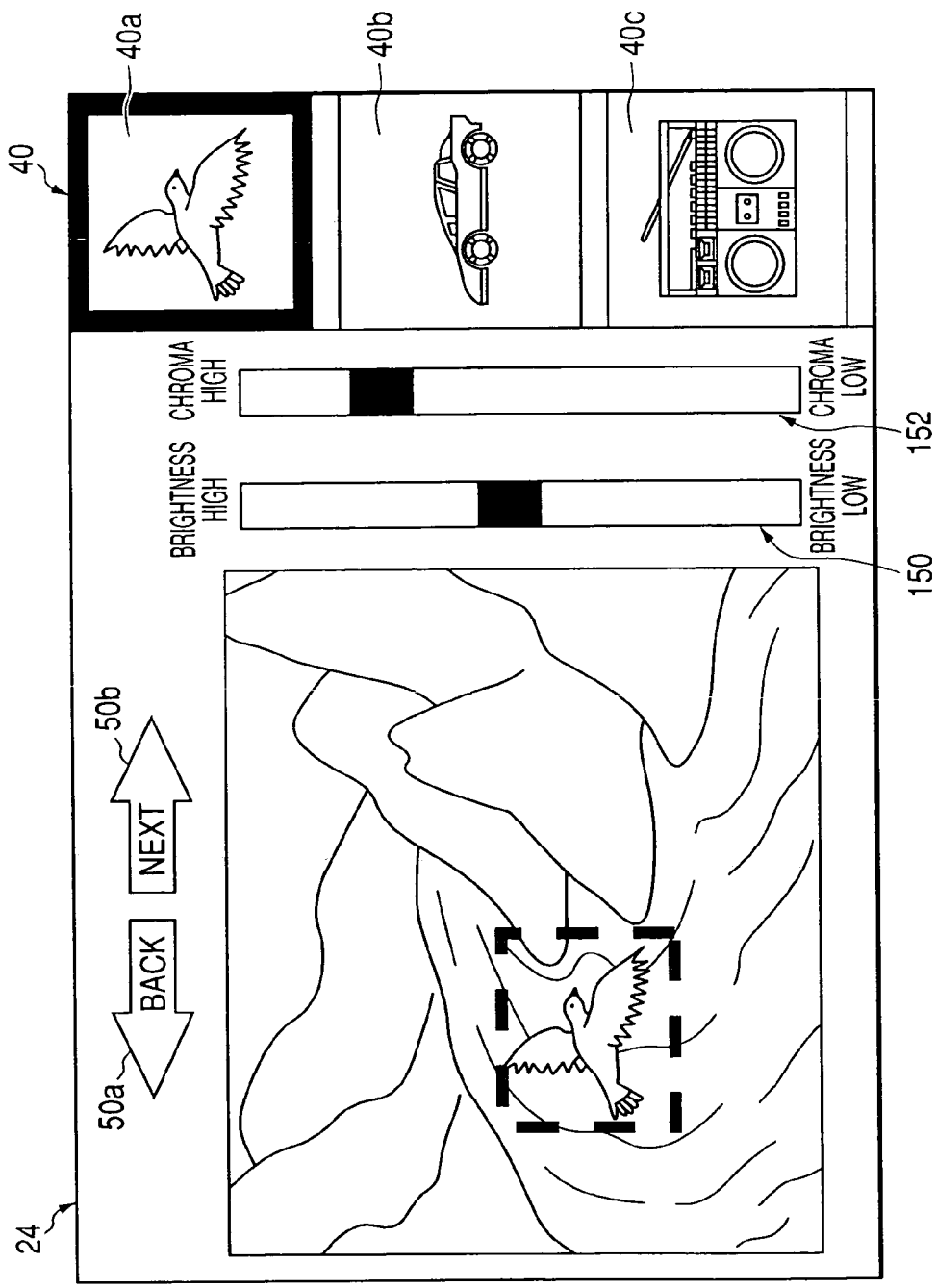
FIG. 9 shows a screen example in which gradation and/or hue can manually be adjusted.

Additionally, when the type and exposure condition of lighting light are not attached to the image data as the photographing conditions, the gradation and/or hue can manually be adjusted (S31 to 33). This can be utilized when the photographing condition is attached to the image data, but when the automatic correction of the gradation and hue cannot be satisfied. Specifically, a manual adjusting mode is set (S31). As shown in FIG. 9, a brightness converting slide bar (or button) 150, and a chroma converting slide bar (or button) 152 are displayed on a display panel. When the user operates either slide bar (or button) 150 or 152, the hue and contrast (or brightness and chroma) of an object image part are adjusted (S32). Of course, after a specific object portion is designated, the hue of the specific portion can be adjusted on trial. Subsequently, when the similar adjustment is performed on the portions other than the specific portion, adjustment degree is confirmed at a high speed with respect to a small area as the specific portion. The constitution of adjusting the whole cannot be provided until preferable adjustment is made. When the user confirms the synthesis result, and inputs recording instruction (S33), the synthesized image is recorded in the recording medium 140 (S30).

As described above, a natural synthesized image can be generated and recorded by a simple operation on a photographing spot.

Figure 10:
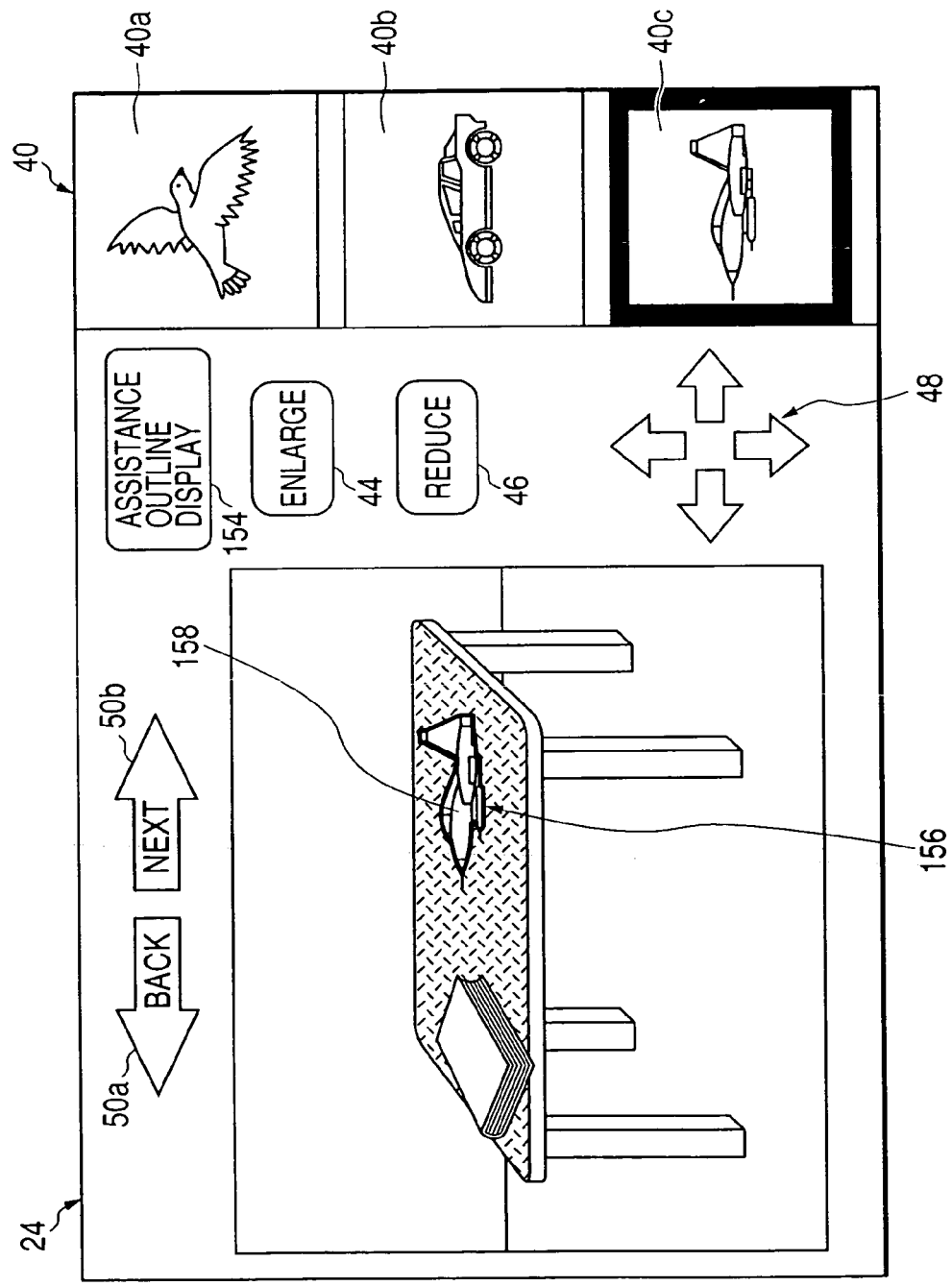
FIG. 10 shows a screen example provided with an assistance outline display button 154.

In the first and second embodiments, the object outline obtained as the extraction processing result of the object or the rectangular frame data substantially abutting on the outline from the outside may be recorded as the assistance outline data in the storage unit 20 or the recording medium 30 or 140. As shown in FIG. 10, there is provided an assistance outline display button 154 on the display panel. When the button 154 is pushed, the control signal generation circuit 22 reads the assistance outline data from the storage unit 20 or the recording medium 30 or 140, and overlaps/displays an assistance outline 156 on the input image on the screen of the display 24. An object image 158 surrounded by the assistance outline 156 may not agree with the object image 40c.

When the set photographing condition (especially, the photographing magnification, eye direction, and the like) fluctuates, the size, position and form of the assistance outline 156 can automatically be changed with the fluctuation. In this case, when size A peculiar to the object is given beforehand as the incidental information, the size on the screen determined by the photographing conditions such as the photographing magnification and rough object distance (estimated from the focus state, and the like) is calculated. The assistance outline 156 is displayed on the display 24 with the size.

For example, assuming that a focal distance is f, a deviation from the maximum value of a focusing level is dp, the standard size of the object is A, and the distance to an image pickup element surface from the second main point position of the image formation optical system is v, an object size S on the screen is given by the following equation:

$$S = A(v-f)\{1+(v-f)dp/f\}/f \qquad (1)$$

In the equation, the fluctuation of the object distance and the fluctuation of the focusing signal level are linear. Therefore, when dp is measured, and f is obtained from the lens position, the size of the auxiliary data may be changed according to magnification S/A based on the equation (1).

Moreover, if necessary, the user may use the instruction selection unit 26 to set the auxiliary data in an appropriate position or correct the size.

A technique of extracting the object used in the embodiment will be described. In general, the assistance outline (or mask data as the area data inside the assistance outline) is set/displayed as an initial outline (or initial area) in an appropriate position on the input image, and used as initial data to carry out the following object cut processing.

Specifically, a method using an active contour as a base is performed (M. Kass, A. Witkin, D. Terzopoulos, "Snakes: Active Contour Models", International Journal of Computer Vision, pp. 321–331, 1988). The active contour method for extracting the object outline from edge information comprises modifying an outline model to minimize an energy evaluation function representing the restricting condition that the outline is smooth on the edge, so that the initial outline is converted to the outline on the object. Moreover, as a developed concrete technique, for example, a known technique comprises exerting an inward or outward external force to points on the active contour based on the difference in characteristic amount between the image in the vicinity of the initial outline and the image of the local area of the object portion (e.g., R. Ronfard, "Region-Based Strategies for Active Contour Models", International Journal of Computer Vision, pp. 229–251, 1994, Eito et al., "Active Contour Extraction based on Description of Region obtained from Clustering", Journal of the Society of Electronic Information Communication D-II, vol. J75-D-II, pp. 1111–1119, 1992, and the like).

The technique of cutting the image is not especially limited, but in the above-described method, cutting can automatically be performed on the condition that the initial outline style is well approximate to the object shape. This respect is preferable.

The position and size of the object to be cut may roughly be designated (e.g., the closed curve surrounding the object, rectangular frame, and the like), and recorded as the incidental information together with the image beforehand. After the photographing is completed, the image is cut or synthesized on the other terminal by a post processing. Moreover, the image data inside the outline may be extracted as it is, and synthesized and recorded with the background image.

Figure 11:
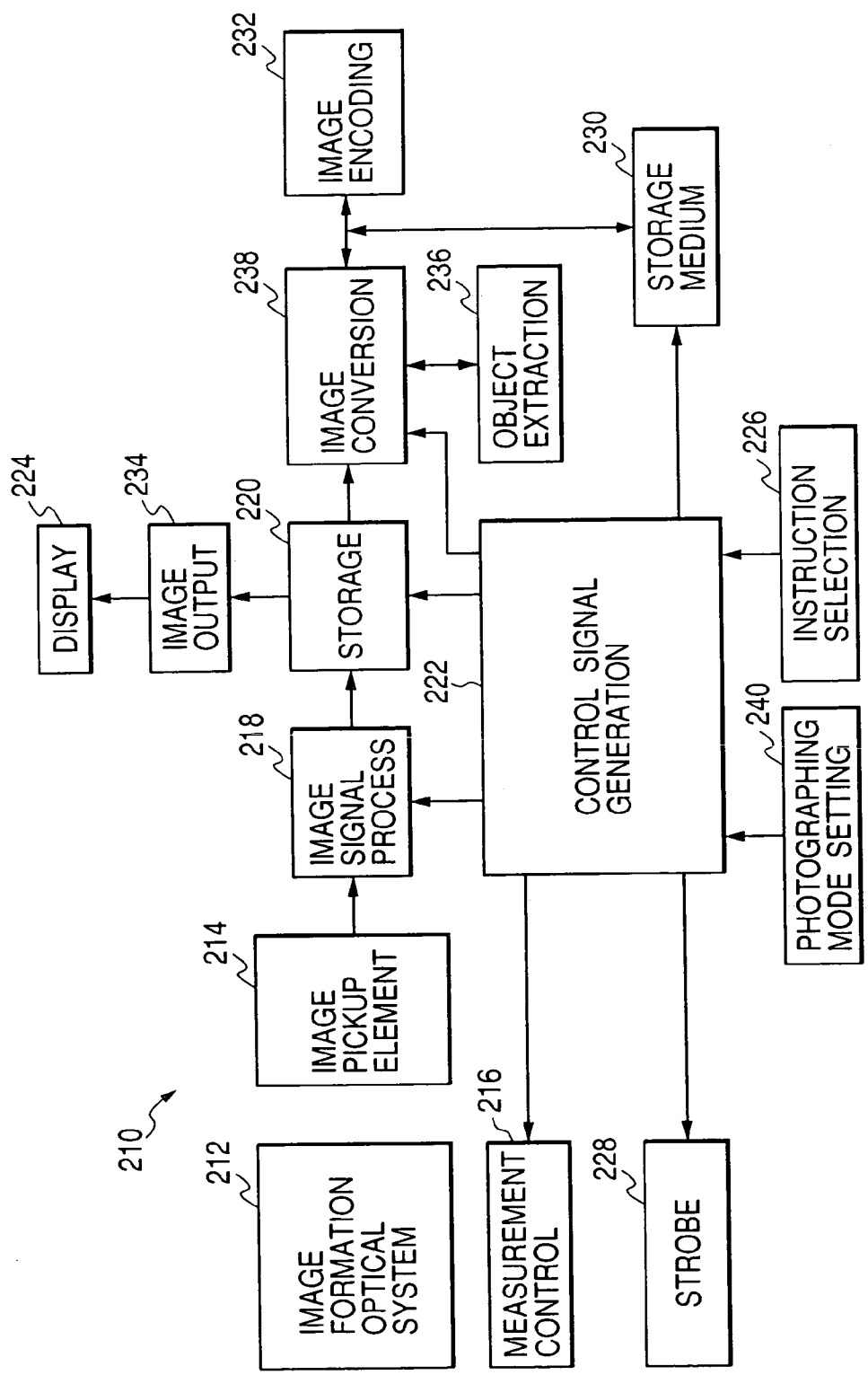
FIG. 11 is a schematic constitution block diagram of a third embodiment of the present invention.

FIG. 11 is a schematic constitution block diagram of a third embodiment of the present invention. A photographing image processing apparatus 210 comprises an image formation optical system 212 including a photographing lens and a zoom photographing drive control mechanism; an image pickup element 214 such as CCD image sensor; a measurement control circuit 216 for measuring and controlling image pickup parameters; an image signal processing circuit 218; a storage unit 220; a control circuit 222 for controlling an image pickup operation and image pickup conditions, and generating control signals of an image processing and image output; a display 224 serving also as finders such as EVF (electronic view finder); an instruction selection unit 226 comprising a pen type key, a cross key, and the like; a strobe emission unit 228; a storage medium 230; an image encoding circuit 232; an image output circuit 234; an object extraction circuit 236; an image conversion circuit 238; and a photographing mode setting unit 240.

Figure 12:
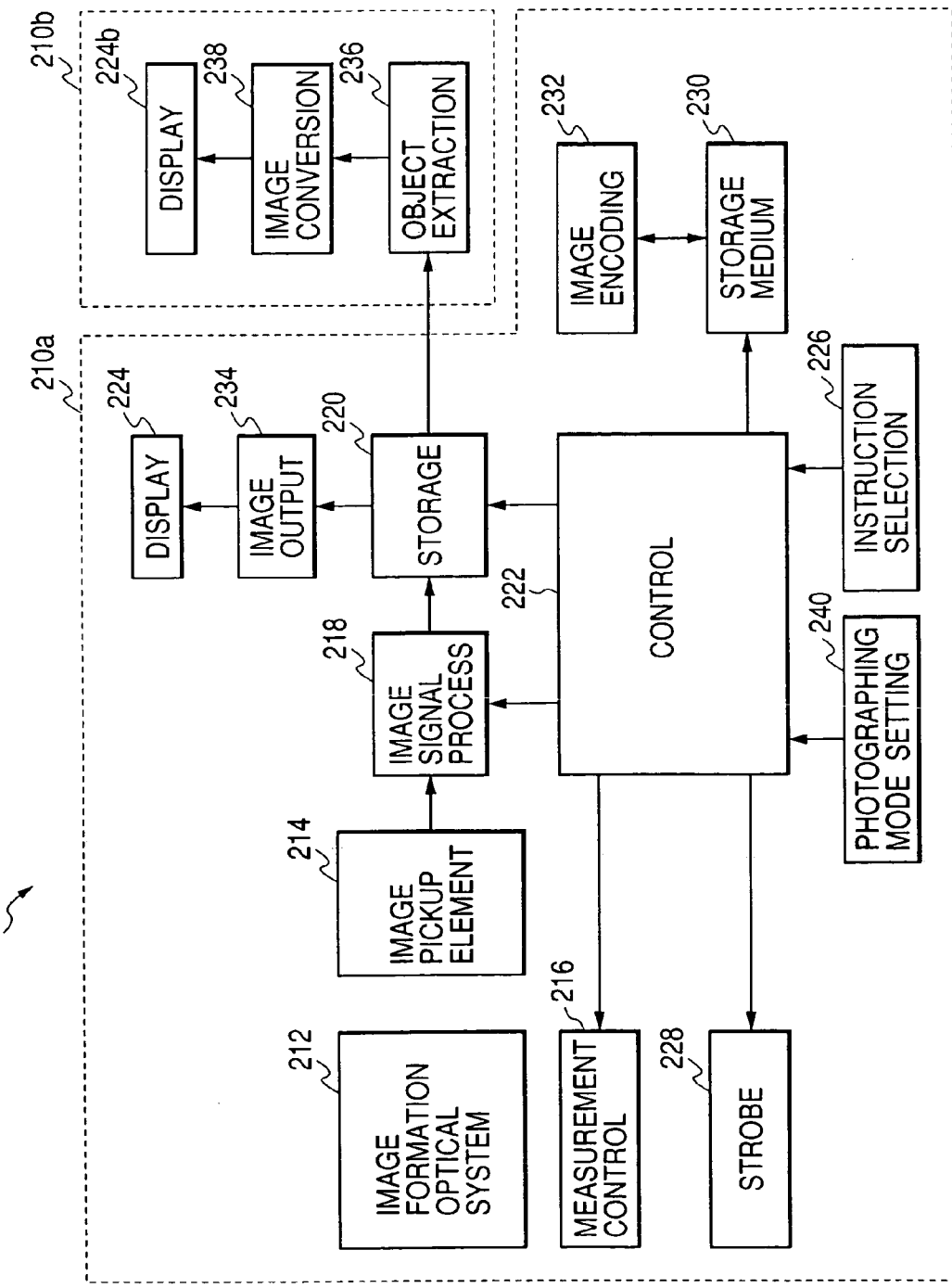
FIG. 12 is a schematic constitution block diagram of a modification of the third embodiment.

As shown in FIG. 12, the photographing image processing apparatus 210 is separated into a main body 210a and an image processing section 210b, the object extraction circuit 236, the image conversion circuit 238 and a display 224b are accommodated in the image processing section 210b, and the remaining components are accommodated in the main body 210a.

A touch panel is integrally formed on the display 224. When an operation panel is displayed on the screen of the display 224, the displayed operation panel forms one mode of the instruction selection unit 226.

The image signal processing circuit 218 comprises a magnification detection circuit for detecting the magnification of a zoom lens whose photographing magnification can be changed; a focusing state detection circuit for detecting the focusing state of the image pickup surface of the image pickup element 214; an exposure amount control circuit for controlling the charge accumulation time of the image pickup element 214 and/or the diaphragm aperture diameter of the image formation optical system 212; a strobe emission control circuit; and a control signal generation circuit for generating the control signals of image signal properties such as gamma property, knee property and color balance. Some of these components are realized by software. The image pickup parameters include the photographing magnification, focus state and exposure amount, additionally the eye direction, the presence/absence of strobe emission, and types of lighting light (e.g., sunlight, fluorescent lamp, incandescent lamp, strobe light, and the like). The eye direction is detected by a sight line detection unit (not shown) incorporated in the photographing image processing apparatus 210.

The image signal processing circuit 218 has a correction circuit of gamma, knee, white balance, and the like, an auto-focus (AF) circuit, an automatic exposure (AE) control circuit, an automatic gain control (AGC) circuit, and the like.

The instruction selection unit 226 comprises the pen type key and/or the cross key, and the like. On the other hand, a touch panel is integrally formed on the display 224. When an operation panel is displayed on the screen of the display 224, the displayed operation panel forms one mode of the instruction selection unit 226.

The storage unit 220 comprises a frame buffer, a video RAM, a ROM for storing template data for use in conversion photographing and processing program for use in image conversion, and other primary storage units.

The storage medium 230 comprises disk media such as a magnetic tape, an optical disk and an optomagnetic disk, and various media such as a flash memory and an IC memory. In the embodiment, the storage medium 230 is not especially limited. The storage medium 230 is detachably attachable to the photographing image processing apparatus 210.

The image encoding circuit 232 compresses/encodes the image data together with the incidental data such as the photographing condition in the predetermined format.

In the embodiment, during photographing, a desired processing can automatically be applied to the photographed image. This is called a conversion photographing mode in the present specification. The conversion photographing mode includes a red eye correction mode, a beard removal mode, a stain/freckle removal/addition mode, and the like.

For the size and position of the object in the screen, the user can select one of two modes of an automatic detection mode and a manual setting mode. In the embodiment, unless the user designates otherwise, the automatic detection mode is set.

In the embodiment, the outline coordinate data of the model outline belonging to an object category or the frame having the predetermined shape (rectangular, elliptical and other shapes) and substantially abutting on the outline from the outside is recorded and prepared as the assistance outline data in the storage unit 220 or the image recording medium 230 beforehand. Moreover, as the model outline, the partial outline of the shape representing the category of the object to be extracted, such as the outline of the model comprising local characteristic elements described in Japanese Patent Application Laid-Open No. 7-320086 by the same applicant as that of the present application, may be used.

In the automatic detection mode, by a method described later, the assistance outline (above-described model outline) data having the size set based on the photographing conditions such as the magnification and object distance are scanned in order from the end on the screen, the coincidence (e.g., correlation value) with the edge strength distribution of the input image is evaluated in each place, and the maximum position of the coincidence is obtained as the optimum position. Even when a plurality of extraction object areas are included in this manner, the detection of the positions of a plurality of object areas and the area extraction can automatically be performed.

The content of each conversion mode will briefly be described. In the beard removal (addition) mode, stain/freckle removal mode, and the like, first a person head or face is detected from the input image.

As a processing of detecting the face or eye, another method may comprise using a standard template image (concentration image or color image), appropriately changing the size of the image based on the photographing condition to obtain the correlation value in each position of the image, and detecting a position in which correlation becomes maximum or extremely large.

In the manual setting mode, the control circuit 222 displays the assistance outline (the face outline displayed by the closed curve, and the like) on the screen of the display 224 as described later, and the user adjusts the photographing conditions such as the magnification and sight field direction substantially within the assistance outline, or changes the position and size of the assistance outline.

In the red eye correction in the automatic detection mode, the eyes in the input image are detected, and the pixels corresponding to red eyes are selectively converted to black pixels. The detail of this processing will be described later. In the manual setting mode, the eye model outline (both eyes or one eye) is displayed as the assistance outline on the screen of the display 224, and the user sets the photographing condition.

In the beard removal mode, after the face area is detected, face flesh color components are extracted, and the area pixels of black or grayish white color in an area where the beard could exist, excluding the hair in the face, are converted to those of the flesh color.

In the stain/freckle removal mode, after the face area is removed, the representative color component values of face flesh color components are extracted, and the pixel values of the area having the color components different from the flesh color representative color component values are converted to the color component values of the representative color particularly in each of cheek, chin and forehead areas of the face.

In each of the above-described modes, the specific portion of the object is converted, and the conversion object range needs to be specified with a high precision. Details of a process of extracting the object area and a process of converting the image of the object portion will be described with reference to FIG. 13.

The user first sets the conversion photographing mode by the photographing mode setting unit 240 (S41). After setting the conversion photographing mode, the image including the object to be converted is photographed (S42), and it is determined whether the mode is an automatic detection mode or a manual setting mode (S43).

In the manual setting mode (S43), the instruction selection unit 226, and the like are used to designate a position where the object is present by the object extraction unit 236 (S44). For example, when the pen type of the instruction selection unit 226 is used, the point corresponding to the reference point (face center, and the like) of the object of the input image displayed on the display 224 is instructed with the pen. The position of the eye direction detected and obtained by an eye detection unit may be used as the reference point.

Figure 14:
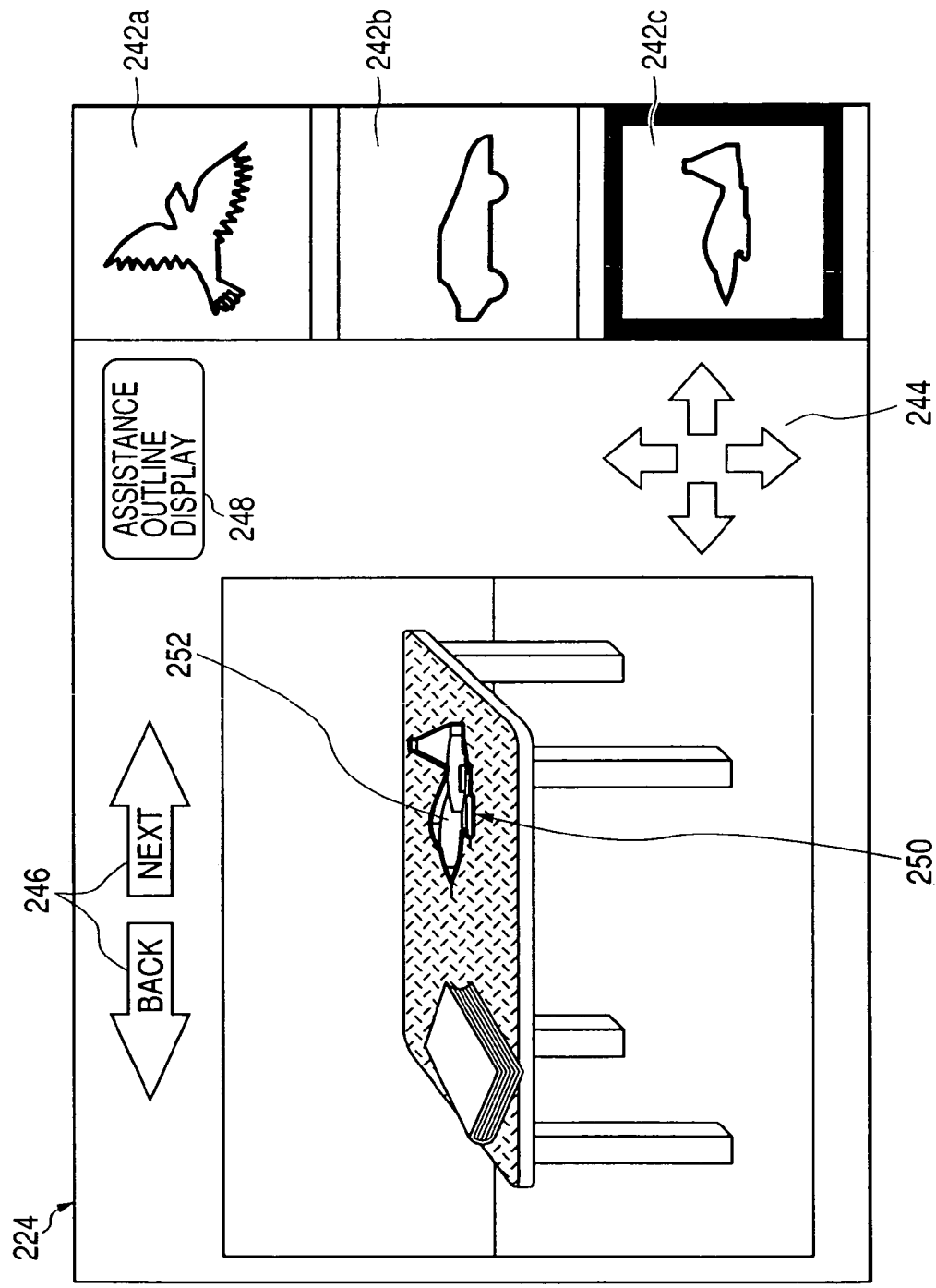
FIG. 14 shows a display screen example in the third embodiment.

In the automatic detection mode (S43), as shown in FIG. 14, the control circuit 222 reads the assistance outline data from the storage unit 220 or the recording medium 230 (S45). Furthermore, an assistance outline 250 (FIG. 14) may be overlapped and displayed on the input image centering on the reference point position on the screen of the display 224. By pushing an assistance outline displaying button 248 (FIG. 14), the display operation may be started. As described above, the assistance outline is the outline of the face represented by the closed curve, and indicates the schematic shape of the area to be converted. Specifically, the outline is different from a marker which simply indicates the object position.

The control circuit 222 automatically sets and changes the size, position or shape of the assistance outline data in accordance with the set photographing condition (especially, the magnification and eye direction), or in accordance with the fluctuation (S46). In this case, assuming that the size A peculiar to the object is given beforehand as the incidental information, the control circuit 222 calculates the auxiliary data size on the screen from the photographing conditions such as the magnification and approximate object distance (estimated from the focus state), converts the size to an appropriate size, and displays the closed outline on the display 224. For example, assuming that a focal distance is f, a deviation from the maximum value of a focusing level is dp, the standard size of the object is A, and the distance to the image pickup surface from the second main point position of the image formation optical system is v, the object size S on the screen is given by the following equation:

$$S = A(v-f)\{1+(v-f)dp/f\}/f \tag{2}$$

In the equation, the fluctuation of the object distance and the fluctuation of the focusing signal level are linear.

Therefore, when dp is measured, and f is obtained from the lens position measurement, and the like, the size of the auxiliary data may be changed according to magnification S/A based on the equation (2). It goes without saying that the object distance may be estimated by the other units (e.g., a distance measurement unit using, for example, laser beams, and the like).

The object extraction circuit 236 sets the assistance outline (or the mask data as the area data inside the assistance outline) as the initial outline (or initial area) in the appropriate position on the input image, and uses the outline as the initial data to carry out the object area extraction processing (S47). When the manual setting mode is selected, however, the inside of the set assistance outline is extracted as the object area. For example, when the red eye correction mode is set as the photographing mode, as the assistance outline, a rectangular outline, which includes both eyes of a person object corresponding to the both eye shape outline model or the standard photographing distance and has substantially the same size as the interval of both eyes, and the like are used.

The system for use in the embodiment is based on the active contour method described in Japanese Patent Application Laid-Open No. 9-185719 by the same applicant as that of the present application. The active contour method comprises modifying the outline model to minimize the energy evaluation function representing the restricting conditions that the outline model (initial outline: corresponding to the assistance outline in the embodiment) is given and the outline shape is smooth on the edge, so that the outline is converted to the outline on the object.

By converting the size regarding the assistance outline based on the photographing condition, the assistance outline can automatically and substantially be matched with the outline of the object to be extracted. Therefore, the object area to be converted can be extracted quickly and stably irrespective of a complicated background portion image pattern and a complicated object shape.

As described above, after the area inside the automatically obtained outline (closed curve) is extracted as the object area, binary mask data is generated such that the data becomes "1" in the object area and "0" in the other areas. With respect to the image belonging to the mask area (e.g., the area with the mask value of "1"), the image conversion circuit 238 performs a conversion processing in accordance with the conversion photographing mode (S48).

Figure 15:
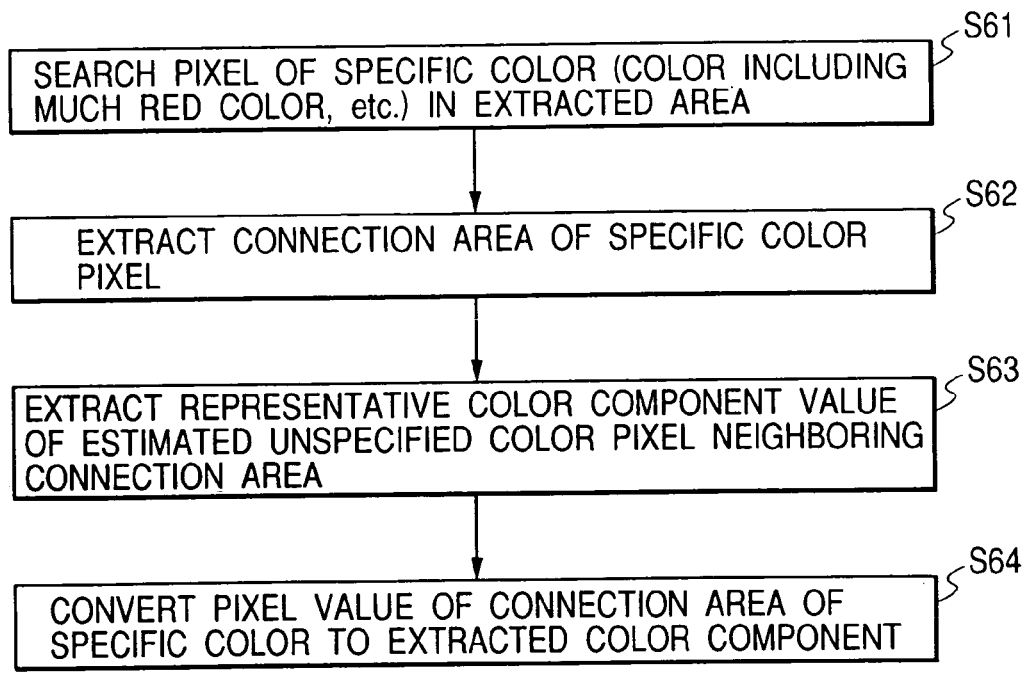
FIG. 15 is a flowchart of an image conversion processing in the third embodiment.

For example, when the red eye correction mode is set as the photographing mode, the red eye correction processing is performed on the pixel of the red component of the extracted area. Specifically, as shown in FIG. 15, the pixel including much red as the specific color is searched in the mask area (S61), and a connection area is extracted (S62). Subsequently, the representative color component is extracted from the group of pixels in the area neighboring the connection area in the range of the estimated color components such as black and brown (S63). The corresponding pixel color component value is converted to the representative color (black, and the like) (S64). Instead of predetermining the allowable color component value as the representative color, the color component value (e.g., brown, blue, gold components, and the like) of the pixel disposed in the vicinity of the corresponding pixel and having non-red and non-white color component value may be used. Instead of extracting the connection area, the red component pixel in the mask area may uniformly be converted to have a predetermined color component value.

An example of an automatic processing (corresponding to the processing of extracting the area to be specified at S47 of FIG. 13) will be described with reference to FIG. 16, which is used in common for the red eye correction mode, stain/freckle removal mode and beard removal mode and which can specify the converted portion area. Here, the assistance outline is given by the outline model of the object to be converted, and subjected to scaling beforehand based on the photographing conditions such as the magnification and object distance as described above.

First, the point corresponding to one of an inflection point, a corner, a curvature maximum point, and the like is extracted as the characterizing point of the outline model (S71), and the type and position of each point are recorded. The data may be given beforehand as the incidental information of the outline model.

The edge strength distribution of the input image is obtained by filtering which includes space differential operations such as Sobel, Prewitt and Canny (S72). The obtained edge strength distribution is binarized by a predetermined threshold value, and, if necessary, subjected to thinning, tracing of the maximum position of the edge strength distribution, and other processings to extract the outline data (S73).

The characterizing point (and its type) is detected from the extracted outline in the same manner as the model data (S74), the characterizing points between both outline data are correlated (S75), and the displacement vector between the corresponding points is extracted (S76). Since the displacement vector gives a relative displacement centering on the gravity center, the vector is normalized, for example, by setting the offset amount to zero (S76).

Each characterizing point is moved based on the amount of the displacement vector (S77), and a curve connecting the moved adjacent characterizing points is generated by spline interpolation, and the like, to modify the outline model (S78).

The associating between the curves is not limited to the above-described method, and needless to say, other systems may be used.

The area inside the outline (closed curve) of the modified outline model obtained in this manner is the area specified as the object of image conversion. Furthermore, if necessary, other techniques such as the active contour method may be used for the correction. By the above-described matching processing and by specifying the area to be modified, the photographed image (output image of the image pickup element 214) is automatically subjected to a desired image conversion irrespective of the complicated shape of the portion requiring the conversion.

After the above-described object area extraction and image conversion processing, the encoding circuit 232 compresses/encodes the converted image (S50), which is recorded in the recording medium 230 (S51). Additionally or alternatively, the image output signal generation circuit 234 generates and outputs the image signal (of NTSC or PAL system) from the converted image (S52).

In the image format outputted from the encoding circuit 232, for example, the presence/absence of execution of image conversion, conversion photographing mode, conversion position, and assistance outline data are recorded in the header or the separately prepared incidental information data file. As occasion demands, the photographing condition, photographing date/time, and incidental information such as compression ratio and compression system are recorded. An example of the representation method concerning the recording format of these items is shown in FIG. 17.

The incidental information may be recorded as electronic watermark data so that it cannot visually be recognized on the image (Proc of the IEEE, vol. 83, pp 944–957, 1995). For example, there is a method comprising allocating the lowest bit representing the image data as the writing bit of these data, and embedding the bit in the edge portion of the image. In this case, the outline of the conversion portion can be superimposed and recorded on the image data.

In the embodiment, an object 252 of FIG. 14 does not necessarily agree with an object image 242c as an extracting model. Because a correct object outline can be obtained by the active contour method, and the like.

In the embodiment, the extracted object area is subjected to image conversion. Conversely, needless to say, the background portion may be subjected to image conversion. This also applies to the following embodiment.

Additionally, the constitution shown in FIG. 12 may comprise supplying the photographing condition, image data and model outline to the object extraction circuit 236 after photographing; utilizing the photographing condition to obtain the conversion area; and performing the above-described image conversion. In this case, the image processing section 210b separated from the main body 210a can be realized, for example, by the computer. The functions of the object extraction circuit 236 and the image conversion circuit 238 are realized by the program of the procedure shown in FIGS. 13 and 15.

Figure 18:
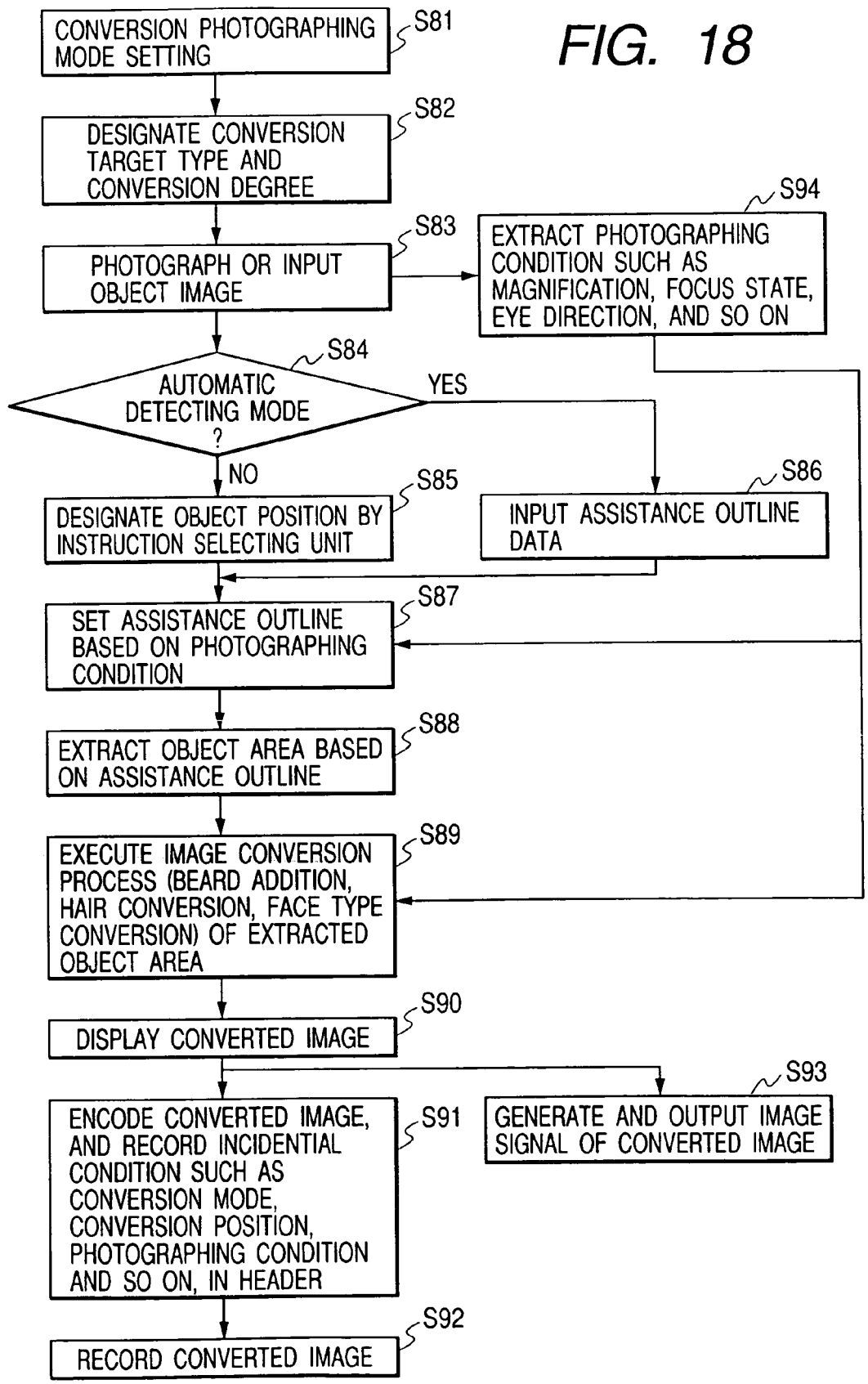
FIG. 18 is another flowchart of the image conversion processing.

An embodiment will next be described, in which the predetermined image portion set or extracted with respect to the input image is subjected to a geometrical conversion processing or a replacement processing in the method shown in the above-described embodiment. A flowchart of the entire procedure is shown in FIG. 18. FIG. 18 is basically the same as the processing flow shown in FIG. 13 except the setting of the conversion photographing mode.

A conversion processing as the object (S89 of FIG. 18) comprises, for example, hair conversion, beard addition conversion, face type conversion, composite sketch, processing for thickening or thinning the image area with respect to face, body parts (arms, legs, and the like) or the entire body, modifying of parts such as eyes, nose and mouse as face constituting elements or changing of geometric arrangement of the parts, replacement processing of the parts to the prepared part image data, and the like.

In the embodiment, the conversion photographing mode is set (S81). Subsequently, the above-described conversion type and degree are set, or further fractionated types, and the like are selected from the same conversion category (S82).

Figure 13:
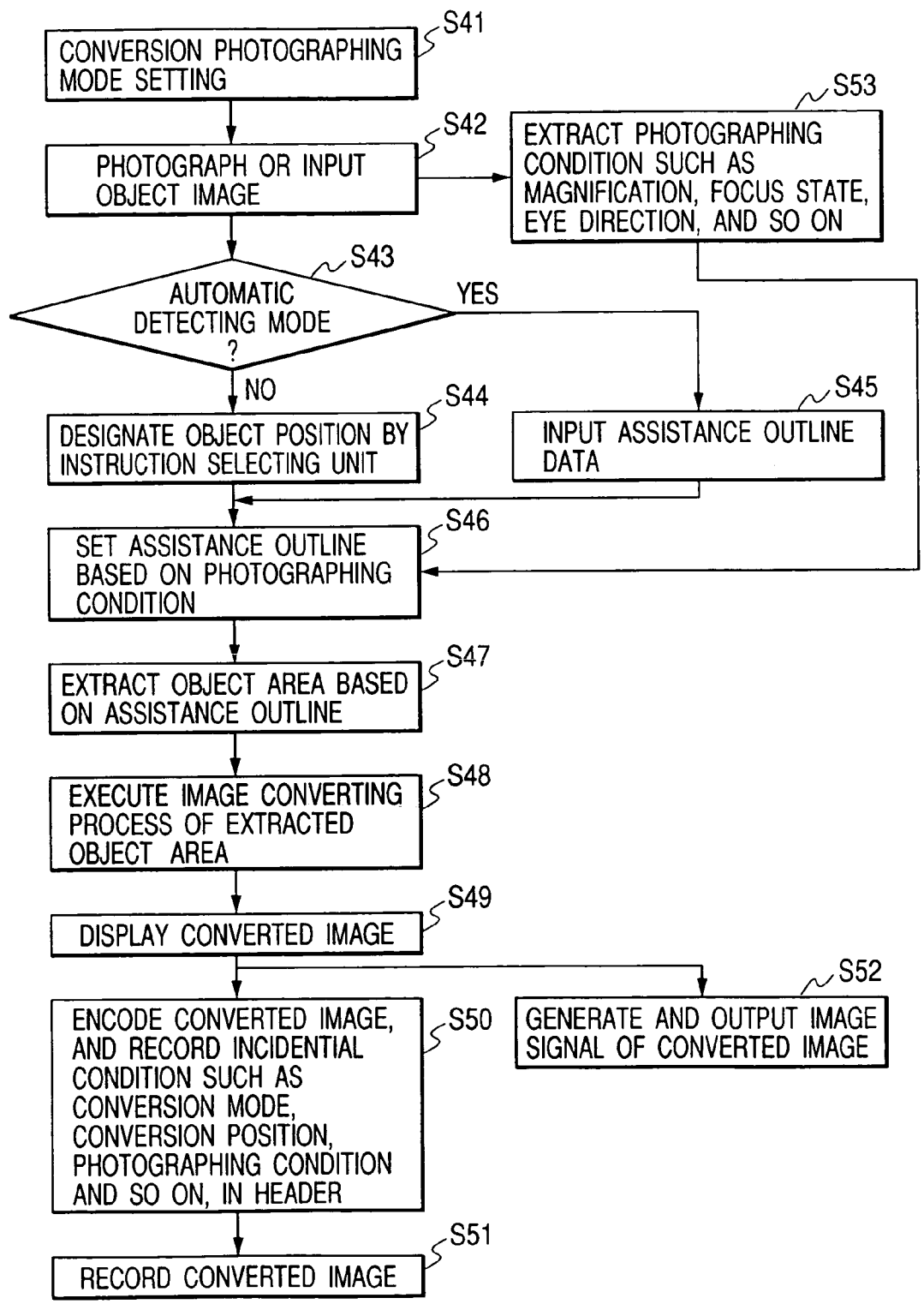
FIG. 13 is a flowchart showing the procedure of a conversion photographing processing in the third embodiment.

Steps S83 to S87 form the same processing flow as that of S43 to S47 of FIG. 13. Subsequently, the object area is extracted as the conversion object (S88), and the photographing condition, extracted area size, and the like are subsequently used to execute a conversion processing well fit for the shape of the conversion object (S89).

Figure 19:
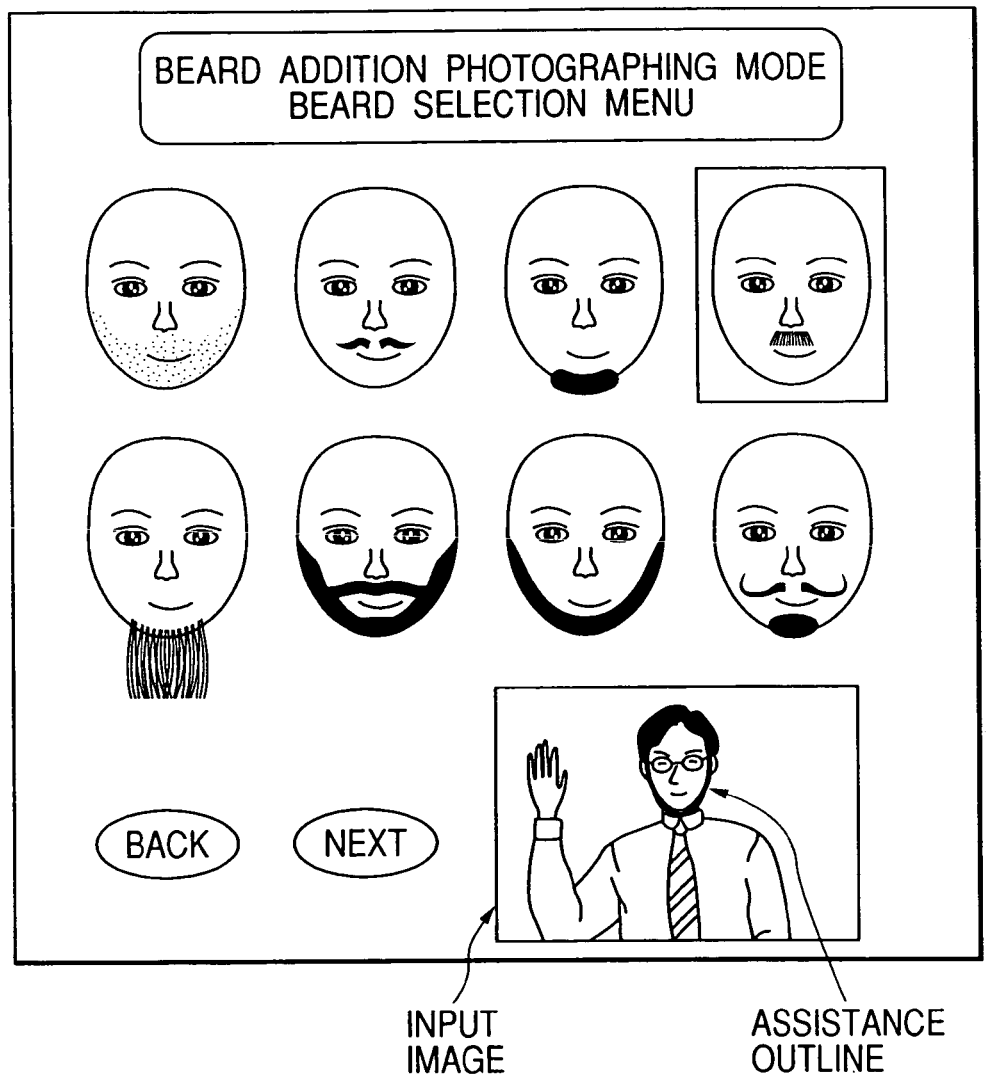
FIG. 19 shows a selection menu display screen during beard addition photographing.
Figure 20:
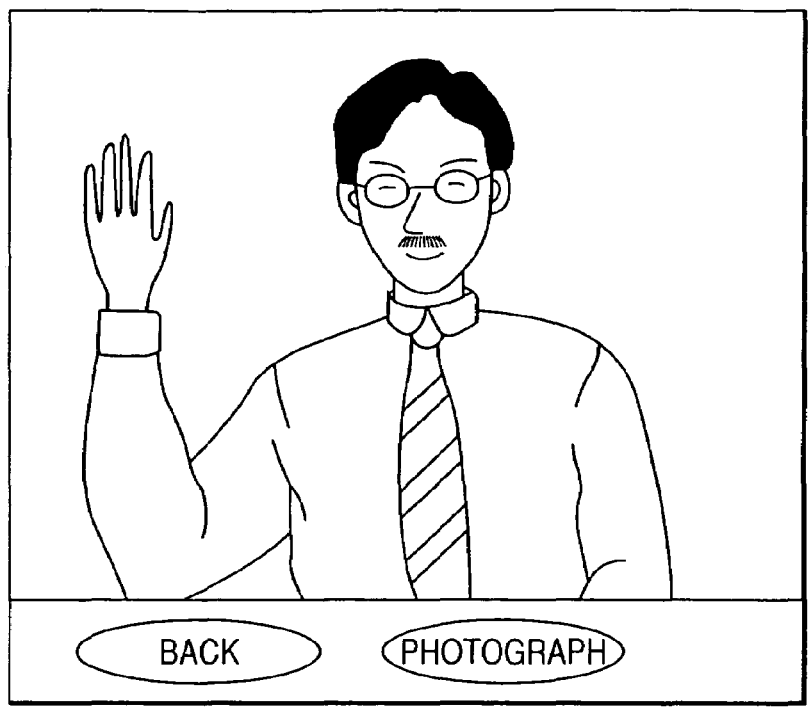
FIG. 20 shows an image example after beard addition conversion.

The beard addition conversion mode comprises a processing of so-called texture mapping (refer to "Ray Tracing" authored by Shinichi Takemura and published by Ohm, Corp.) of the image data of pre-selected beard in the predetermined position of the face in the image. FIG. 19 shows an example of beard type selection screen when the conversion photographing mode of beard addition is set. A list of beard type images is displayed on the display 224, and the user uses the instruction selection unit 226 to select one from the list. For example, the cross key is used to move the frame surrounding the image, and a confirmation button (not shown) is pushed to select the image. The input image is displayed in a sub-window in the right lower portion of the screen. After the beard type is selected, NEXT button displayed in the screen is pressed. Then, as shown in FIG. 20, the processing result is displayed on the display. When the user presses the confirmation button, and the like, the conversion photographing (comprising encoding the conversion image, recording the code to the recording medium, and outputting the image signal of the conversion image to the outside) is finally completed. The beard texture mapping is performed by using the equation (2) and extracted area shape to map the texture data of the beard image in an appropriate size and position.

In the face type conversion mode, so-called mophing, replacement, and the like are performed between the face image of the input image and the face image data as the target. By using the model formed of local characteristic elements described in Japanese Patent Application Laid-Open No. 7-320086 by the same applicant as that of the present application to correlate the face parts (eyes, nose, mouth, and the like) of the input image and the target image, the face type conversion is automatically executed. In this case, after converting the target face image to the image with an appropriate size by an automatic scaling based on the photographing condition in the same manner as in the above-described embodiment, the processings such as mophing and replacement are executed.

In the composite sketch mode, after the face area is detected, the sketch model data (so-called template model) of the face prepared beforehand is subjected to automatic scaling as described above, the edge strength distribution of the face area of the input image and the face components of the sketch model are correlated, and further the movement amount and each component modification amount from the model data of component arrangement (gravity center positions, and the like) are linearly or non-linearly amplified to exaggerate the face features. Thereby, a linear image of sketched face is generated.

In the above-described conversion processing, to detect the position of the conversion object area (face area, and the like), the model outline data of conversion object (face, and the like) is inputted from the storage unit, and converted to the data with an appropriate size by the equation (2) using the photographing condition in the same manner as described above with reference to FIG. 13 and the subsequent drawings. The data is scanned in the image, and the position in which the correlation value with the outline obtained from the edge strength distribution of the input image is maximum (extremely large) may be obtained.

Figure 21:
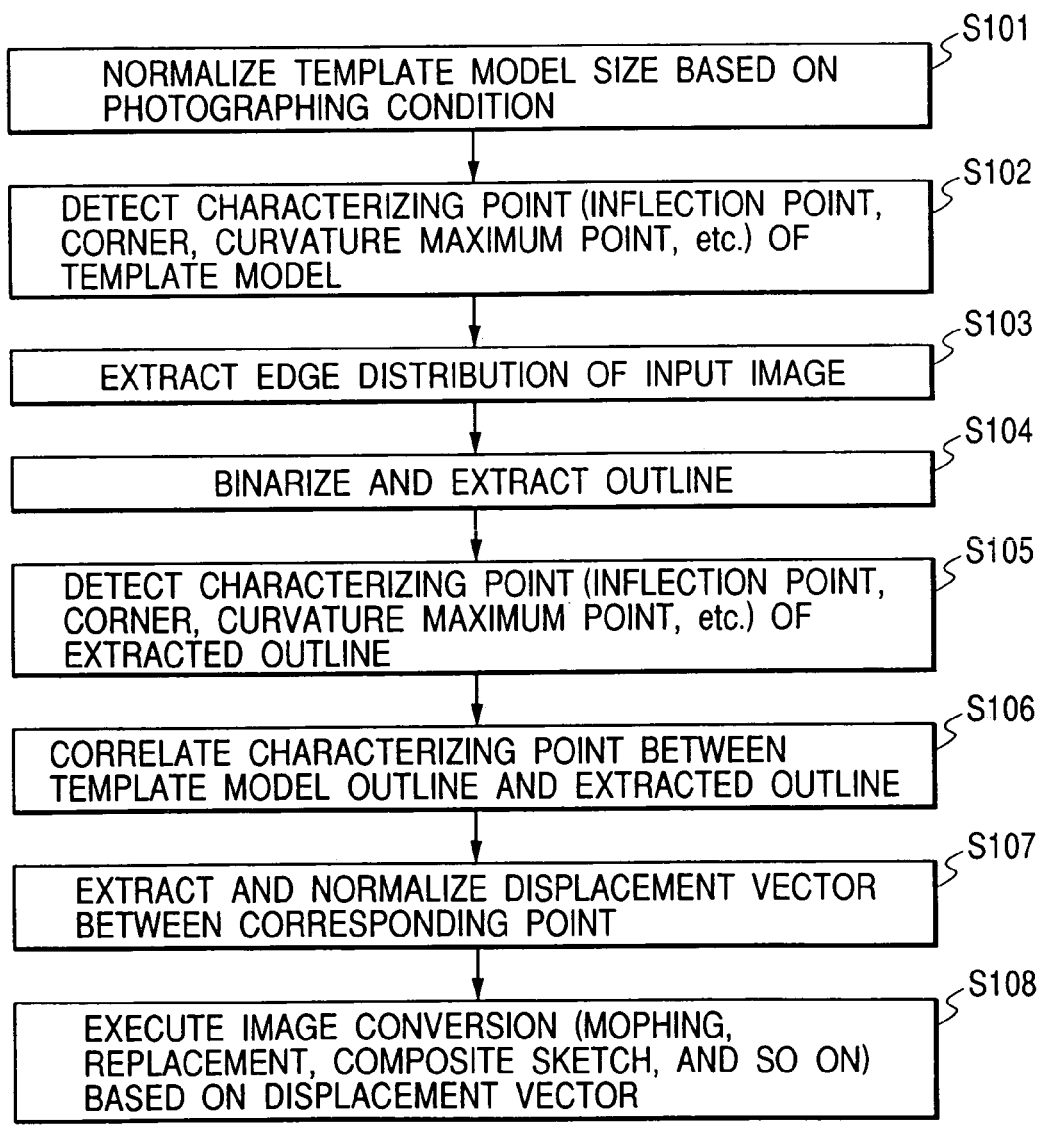
FIG. 21 is a flowchart of a pre-processing of the image conversion shown in FIG. 18.

FIG. 21 shows an example of processing flow obtained by generalizing the processing prior to the conversion processing. The template model size is converted to an appropriate size based on the photographing condition (magnification, object distance, eye direction, and the like) (S101), and the inflection point, corner, curvature maximum point, and the like on the outline data are extracted as the characterizing points of the template model, or the characterizing point data is read from the storage unit as the incidental information of the template model data (S102). The edge strength distribution of the input image is extracted (S103), binarizing and outline extraction are performed (S104), and the characterizing points similar to the extracted characterizing points of the template model are searched and extracted (S105).

The characterizing points are correlated (S106). Thereby, the components constituting the face such as eyes, nose and mouth can be correlated. Specifically, since the gravity center position and size on the image of the template model are appropriately set beforehand based on the photographing condition, the corresponding characterizing point can be searched in the vicinity range of each characterizing point in the input image for each characterizing point on each component (eyes, nose, mouth, and the like) of the template model, and detected.

The displacement vector between the corresponding points is extracted, and normalized using the gravity center position as a reference (S107). Various image conversions are executed based on the result (S108).

The conversion processing of the conversion object area (face image area, and the like) will be described by illustrating a thinning (thickening) processing of face area. In the face thinning processing, magnification change conversion (affine transformation) is performed with respect to the area inside the outline while the vertical magnification is set to one and the transverse magnification is set to a (0<a<1). In the thickening processing, a>1.

Figure 16:
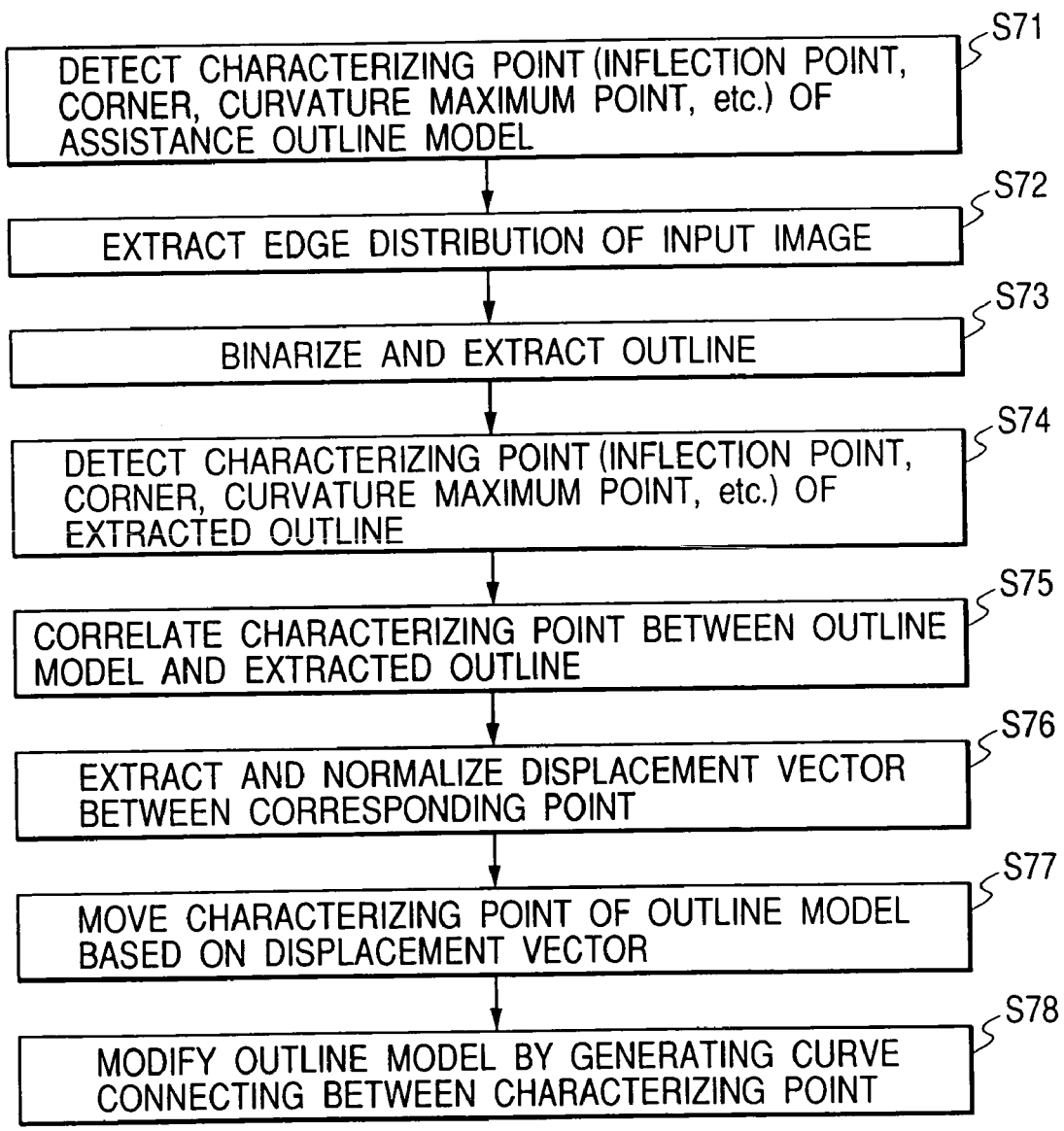
FIG. 16 is a flowchart of an object area automatic extraction processing in the third embodiment.
Figure 22A:
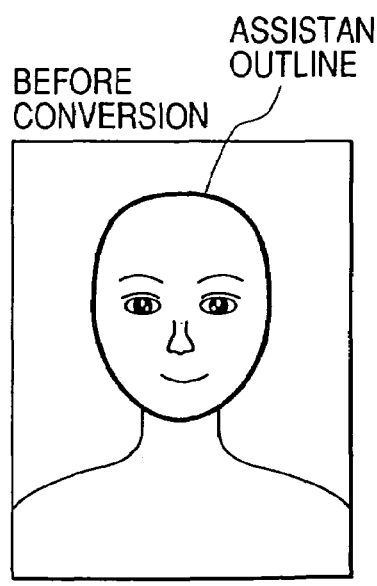
FIGS. 22A and 22B show an example of an object image after conversion during thinning conversion photographing.
Figure 22B:
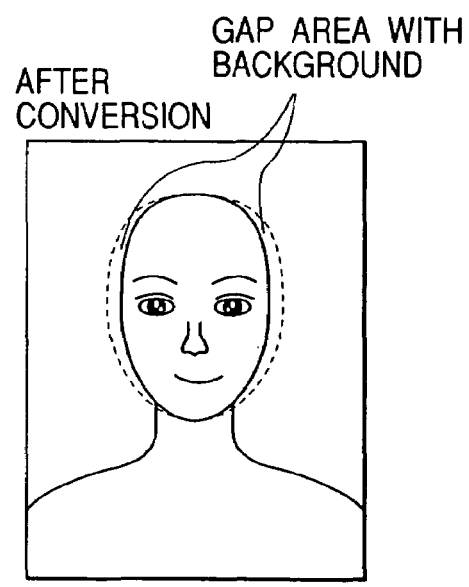

After the position of the face area (position of gravity center or another reference point) is detected, the outline is obtained in the method shown in FIG. 16. FIGS. 22A and 22B show an example before and after conversion in the face thinning processing. In the thinning conversion photographing, a gap is generated between the thinned face and the background portion. The image data of the gap portion is generated as follows. Specifically, the color component value of the image data of the background portion neighboring each outline of the face area of the original image or the texture pattern is extracted, the color component value of the neighboring portion is given to the corresponding portion pixel, or the texture pattern of the neighboring area is mapped. By photographing the image of the entire background beforehand, the gap portion may be replaced with the corresponding background image.

Conversely, in the thickening processing, the conversion object area is protruded to the background area of the original image data, but the image data inside the outline of the converted area may be interpolated with the affine transformation image data of the original conversion object portion.

When the image is replaced with another face image as anther conversion processing, the image area of the conversion object is replaced with another target image converted to the image with the template size set as described above. Additionally, in the same manner as in the face thinning processing, the background image data is inserted to areas such as the gap portion generated by not-matched shapes (see FIG. 22B) by texture mapping or color component extrapolation.

During the composite sketch, the outline data of the original template model is modified by linear extrapolation methods such as an in-between method comprising applying an exaggeration ratio indicating an exaggeration degree so that the dislocation vector between the extracted components can be most amplified in a predetermined manner. For example, the new position of each characterizing point of each local characterizing element is obtained by the linear extrapolation method based on the template model formed of the local characteristic elements described in Japanese Patent Application Laid-Open No. 7-320086 by the same applicant as that of the present application, and a curve smoothly connecting the resulting new local characterizing elements is generated. Thereby, the sketched face image is obtained.

During the coding and recording of the converted image, the original image data of the area as the conversion object can be recorded/stored together with the outline data of the converted object area. Thereby, the original image data can easily be restored later using the processing apparatuses such as the computer if necessary. In the recording mode, the partial image of the object area before the conversion may be recorded in the file separate from the converted image data file, or recorded into the header portion of the converted image data file. When the partial image data file before the conversion is generated, the converted image data file name, and the like are recorded in the header portion.

The method may comprise photographing the background image beforehand, extracting the object area based on the difference between the background image and the input image including the conversion object, and applying the image conversion designated by the user to the area. Here, it is assumed that the photographing apparatus is not fixed to a tripod and is hand-held for use during the photographing. Additionally, as prerequisites, the focus, exposure condition, and the like differ during the photographing of the background image and during the photographing of the input image including the object. When the focus and/or the exposure condition are consistent, the processing is facilitated.

A flowchart of photographing operation, extraction of the object area and conversion processing process is shown in FIG. 23.

The background image is photographed (S111), and the photographing condition is extracted (S125) and stored in the storage unit 220. The conversion photographing mode is set (S112), and the conversion target (hair type, beard type, face type, and the like) and conversion degree are designated as occasion demands (S113). The object image (input image in the previous embodiment) is photographed (S114), and the photographing condition is also extracted (S126), and stored in the storage unit 220.

Subsequently, the corresponding points are extracted between the background image and the input image (S115). To remove the influences of rotation caused by hand-held photographing, parallel movement, magnification fluctuation, and the like, the corresponding point extraction data and geometric conversion parameters (affine transformation or sight through conversion parameter) with the difference in the photographing condition between the images considered therein are estimated and extracted (S116). By considering the difference of the photographing condition, error correspondence is removed in the corresponding point extraction processing, and high-precision geometric conversion can be realized (S117).

The gradation conversion parameter is obtained by considering the difference in the pixel value and photographing conditions such as exposure condition between the corresponding points, and the gradation of the background image is converted (S118). Specifically, by referring to the pixel values (RGB color component values, and the like) between the corresponding points, a pixel value conversion table to the corresponding points of the input image from the background image for gradations of levels 0 to 255 is estimated. In this case, by considering the photographing conditions (exposure condition, and the like) and removing the pixel value data of the corresponding points not fit for the fluctuation amount of the photographing condition, higher precision can be achieved.

A difference is taken between the converted background image and input image, and binarized with the predetermined threshold value, so that the object area is extracted (S119). Since the subsequent processings are the same as those of FIG. 18, the detailed description thereof is omitted.

The present invention may be applied to the system comprising a plurality of apparatuses or to the device comprising one apparatus.

Moreover, the computer in the apparatus or the system connected to various devices to operate the devices so that the above-described embodiment functions are realized is provided with a software program code for realizing the embodiment functions, and the computer (CPU or MPU) of the apparatus or the system may be operated by operating various devices according to the stored program.

In this case, the software program code itself realizes the above-described embodiment function, and the embodiment is constituted of the program code itself and units for supplying the program code to the computer such as the storage medium in which the program code is stored. As the storage medium in which the program code is stored, for example, a floppy disk, a hard disk, an optical disk, an optomagnetic disk, CD-ROM, a magnetic tape, a nonvolatile memory card, ROM, and the like can be used.

Moreover, when the computer executes the supplied program code, the above-described embodiment functions are realized. Additionally, when the program code cooperates with OS (operating system) operating in the computer or another application software, the above-described embodiment functions are realized. It goes without saying that such program code is also included in the embodiment of the present invention.

Furthermore, after the supplied program code is stored in the memory disposed in the function expansion board of the computer or the function expansion unit connected to the computer, the CPU, and the like disposed in the function expansion board or the function expansion unit performs a part or the whole of the actual processing based on the instruction of the program code, and the above-described embodiment function is realized by the processing. It goes without saying that this case is also included in the embodiment of the present invention.

As described above, in a group photograph, a souvenir photograph or a catalog photograph, a natural synthesized image including a person or an object not present on the spot can be generated in accordance with the composition of the spot and the photographing condition by a simple operation, and recorded on the photographing sport.

When the assistance outline concerning the shape and size of the object recorded beforehand is used, simply by using the image inside the assistance outline in the same background, the object extraction and synthesized image generation can automatically be performed.

To remove an unnecessary person or object, irrespective of a complicated shape, by photographing the image only of the background, the person/object is easily removed, and the background portion corresponding to the removed portion can be inserted with a simple operation.

Moreover, according to the present invention, by using the photographing condition, the main object image portion having an arbitrary shape or the background image portion excluding the main object is specified with good precision in the image input unit during photographing (during image input) without being influenced by the background image pattern or the lighting condition, the corresponding portion can arbitrarily converted or processed in automatic (semi-automatic) conversion photographing, and the converted image can be recorded or transmitted.

Moreover, since the model outline can be set in the appropriate position of the image by referring to the photographing condition, the area of the portion to be converted can be extracted from the image quickly and automatically, so that the desired conversion photographing can be performed.

When the first and second images are synthesized, the correction processing is performed based on the information concerning the first image so that the synthesized image can be generated without any feeling of difference.

Since the object image is extracted from the image based on the information concerning the image, and the object image is subjected to the conversion photographing based on the information concerning the image, the object image can be specified with good precision, and subjected to the conversion processing with good precision.

What is claimed is:

1. An image processing apparatus, comprising:
first input means for inputting a first image;
second input means for inputting photographing condition information of the first image;
third input means for inputting a second image;
correcting means for correcting said first image; and
synthesizing means for synthesizing said first image and said second image, wherein
said correcting means corrects said first image based on said photographing condition information of the first image, and said synthesizing means synthesizes the first image corrected by said correcting means and said second image;
wherein said correcting means corrects gradation and hue of said first image.

2. An image processing apparatus, comprising:
first input means for inputting a first image;
second input means for inputting photographing condition information of the first image;
third input means for inputting a second image;
correcting means for correcting said first image; and
synthesizing means for synthesizing said first image and said second image; and
adjusting means for adjusting position and size of said first image to synthesize the adjusted first image, wherein
said correcting means corrects said first image based on said photographing condition information of the first image, and said synthesizing means synthesizes the first image corrected by said correcting means and said second image.

3. An image processing apparatus, comprising:
first input means for inputting a first image;
second input means for inputting photographing condition information of the first image;
third input means for inputting a second image;
correcting means for correcting said first image; and
synthesizing means for synthesizing said first image and said second image, wherein
said correcting means corrects said first image based on said photographing condition information of the first image, and said synthesizing means synthesizes the first image corrected by said correcting means and said second image; and
wherein said photographing condition information of the first image includes one of an exposure amount and a shutter speed, and a focus amount, a photographing magnification, a lighting light type, and an eye direction.

4. An image processing apparatus, comprising:
first input means for inputting a first image;
second input means for inputting photographing condition information of the first image;
third input means for inputting a second image;
correcting means for correcting said first image; and
synthesizing means for synthesizing said first image and said second image, wherein
said correcting means corrects said first image based on said photographing condition information of the first image, and said synthesizing means synthesizes the first image corrected by said correcting means and said second image, and
wherein said synthesizing means uses auxiliary data concerning shape and position of said first image to synthesize said first image and said second image.

5. An image processing apparatus according to claim 4 wherein said auxiliary data is either an outline with a predetermined size concerning said first image or mask data.

6. An image processing apparatus comprising:
first input means for inputting a first image;
second input means for inputting photographing condition information of the first image;
third input means for inputting a second image;
correcting means for correcting said first image and said second image; and
synthesizing means for synthesizing said first image and said second image, wherein
said correcting means corrects said first image based on said photographing condition information of the first image, and said synthesizing means synthesizes the first image corrected by said correcting means and said second image, and
said correcting means corrects gradation and hue of said second image.

7. An image processing method, comprising:
a first input step of inputting a first image;
a second input step of inputting photographing condition information of the first image;
a third input step of inputting a second image;
a correcting step of correcting said first image; and
a synthesizing step of synthesizing said first image and said second image, wherein
said correcting step comprises correcting said first image based on said photographing condition information of the first image, and said synthesizing step comprises synthesizing the first image corrected by said correcting step and said second image,
wherein said correcting step comprises correcting gradation and hue of said first image.

8. An image processing method, comprising:
a first input step of inputting a first image;
a second input step of inputting photographing condition information of the first image;
a third input step of inputting a second image;
a correcting step of correcting said first image; and
a synthesizing step of synthesizing said first image and said second image; and
an adjusting step of adjusting position and size of said first image to synthesize the adjusted first image, wherein
said correcting step comprises correcting said first image based on said photographing condition information of the first image, and said synthesizing step comprises synthesizing the first image corrected by said correcting step and said second image.

9. An image processing method, comprising:
a first input step of inputting a first image;
a second input step of inputting photographing condition information of the first image;
a third input step of inputting a second image;
a correcting step of correcting said first image; and
a synthesizing step of synthesizing said first image and said second image, wherein
said correcting step comprises correcting said first image based on said photographing condition information of the first image, and said synthesizing step comprises synthesizing the first image corrected by said correcting step and said second image, and
wherein said photographing condition information of the first image includes one of an exposure amount and a shutter speed, and a focus amount, a photographing magnification, a lighting light type, and an eye direction.

10. An image processing method, comprising:
a first input step of inputting a first image;
a second input step of inputting photographing condition information of the first image;
a third input step of inputting a second image;
a correcting step of correcting said first image; and
a synthesizing step of synthesizing said first image and said second image, wherein
said correcting step comprises correcting said first image based on said photographing condition information of the first image, and said synthesizing step comprises synthesizing the first image corrected by said correcting step and said second image, and
wherein said synthesizing step uses auxiliary data concerning shape and position of said first image to synthesize said first image and said second image.

11. An image processing method according to claim 10 wherein said auxiliary data is either an outline with a predetermined size concerning said first image or mask data.

12. An image processing method, comprising:
a first input step of inputting a first image;
a second input step of inputting photographing condition information of the first image;
a third input step of inputting a second image;
a correcting step of correcting said first image and said second image; and
a synthesizing step of synthesizing said first image and said second image, wherein
said correcting step comprises correcting said first image based on said photographing condition information of the first image, and said synthesizing step comprises synthesizing the first image corrected by said correcting step and said second image, and
said correcting step comprises correcting gradation and hue of said second image.

13. An image processing apparatus, comprising:
first input means for inputting a first image;
second input means for inputting photographing condition information of the first image;
third input means for inputting a second image;
correcting means for correcting said first image; and
synthesizing means for synthesizing said first image and said second image, wherein
said correcting means corrects said first image based on said photographing condition information of the first image, and said synthesizing means synthesizes the first image corrected by said correcting means and said second image;
wherein said synthesizing means synthesizes said first image and said second image, and said correcting means corrects the first image synthesized by said synthesizing means based on said photographing condition information of the first image; and
wherein said correcting means corrects gradation and hue of said first image.

14. An image processing apparatus, comprising:
first input means for inputting a first image;
second input means for inputting photographing condition information of the first image;
third input means for inputting a second image;

correcting means for correcting said first image;
synthesizing means for synthesizing said first image and said second image; and
adjusting means for adjusting position and size of said first image to synthesize the adjusted first image, wherein
  said correcting means corrects said first image based on said photographing condition information of the first image, and said synthesizing means synthesizes the first image corrected by said correcting means and said second image;
  wherein said synthesizing means synthesizes said first image and said second image, and said correcting means corrects the first image synthesized by said synthesizing means based on said photographing condition information of the first image.

15. An image processing apparatus, comprising:
first input means for inputting a first image;
second input means for inputting photographing condition information of the first image;
third input means for inputting a second image;
correcting means for correcting said first image; and
synthesizing means for synthesizing said first image and said second image, wherein
  said correcting means corrects said first image based on said photographing condition information of the first image, and said synthesizing means synthesizes the first image corrected by said correcting means and said second image;
  wherein said synthesizing means synthesizes said first image and said second image, and said correcting means corrects the first image synthesized by said synthesizing means based on said photographing condition information of the first image; and
  wherein said photographing condition information of the first image includes one of an exposure amount and a shutter speed, and a focus amount, a photographing magnification, a lighting light type, and an eye direction.

16. An image processing apparatus, comprising:
first input means for inputting a first image;
second input means for inputting photographing condition information of the first image;
third input means for inputting a second image;
correcting means for correcting said first image; and
synthesizing means for synthesizing said first image and said second image, wherein
  said correcting means corrects said first image based on said photographing condition information of the first image, and said synthesizing means synthesizes the first image corrected by said correcting means and said second image;
  wherein said synthesizing means synthesizes said first image and said second image, and said correcting means corrects the first image synthesized by said synthesizing means based on said photographing condition information of the first image; and
  wherein said synthesizing means uses auxiliary data concerning shape and position of said first image to synthesize said first image and said second image.

17. An image processing apparatus according to claim 16, wherein said auxiliary data is either an outline with a predetermined size concerning said first image or mask data.

18. An image processing apparatus, comprising:
first input means for inputting a first image;
second input means for inputting photographing condition information of the first image;
third input means for inputting a second image;
correcting means for correcting said first image and said second image; and
synthesizing means for synthesizing said first image and said second image, wherein
  said correcting means corrects said first image based on said photographing condition information of the first image, and said synthesizing means synthesizes the first image corrected by said correcting means and said second image,
  said synthesizing means synthesizes said first image and said second image, and said correcting means corrects the second image synthesized by said synthesizing means based on said photographing condition information of the first image and said second image, and
  said correcting means corrects gradation and hue of said second image.

19. An image processing method, comprising:
a first input step of inputting a first image;
a second input step of inputting photographing condition information of the first image;
a third input step of inputting a second image;
a correcting step of correcting said first image; and
a synthesizing step of synthesizing said first image and said second image, wherein
  said correcting step comprises correcting said first image based on said photographing condition information of the first image, and said synthesizing step comprises synthesizing the first image corrected by said correcting step and said second image,
  wherein said synthesizing step comprises synthesizing said first image and said second image, and said correcting step comprises correcting the first image synthesized by said synthesizing step based on said photographing condition information of the first image, and
  wherein said correcting step comprises correcting gradation and hue of said first image.

20. An image processing method, comprising:
a first input step of inputting a first image;
a second input step of inputting photographing condition information of the first image;
a third input step of inputting a second image;
a correcting step of correcting said first image; and
a synthesizing step of synthesizing said first image and said second image; and
adjusting means for adjusting position and size of said first image to synthesize the adjusted first image, wherein
  said correcting step comprises correcting said first image based on said photographing condition information of the first image, and said synthesizing step comprises synthesizing the first image corrected by said correcting step and said second image,
  wherein said synthesizing step comprises synthesizing said first image and said second image, and said correcting step comprises correcting the first image synthesized by said synthesizing step based on said photographing condition information of the first image.

21. An image processing method, comprising:
a first input step of inputting a first image;
a second input step of inputting photographing condition information of the first image;
a third input step of inputting a second image;
a correcting step of correcting said first image; and a synthesizing step of synthesizing said first image and said second image, wherein said correcting step comprises correcting said first image based on said photographing condition information of the first image, and said synthesizing step comprises synthesizing the first image corrected by said correcting step and said second image, wherein said synthesizing step comprises synthesizing said first image and said second image, and said correcting step comprises correcting the first image synthesized by said synthesizing step based on said photographing condition information of the first image, and wherein said photographing condition information of the first image includes one or an exposure amount and a shutter speed, and a focus amount, a photographing magnification, a lighting light type, and an eye direction.

22. An image processing method, comprising:

a first input step of inputting a first image;

a second input step of inputting photographing condition information of the first image;

a third input step of inputting a second image;

a correcting step of correcting said first image; and a synthesizing step of synthesizing said first image and said second image, wherein said correcting step comprises correcting said first image based on said photographing condition information of the first image, and said synthesizing step comprises synthesizing the first image corrected by said correcting step and said second image, wherein said synthesizing step comprises synthesizing said first image and said second image, and said correcting step comprises correcting the first image synthesized by said synthesizing step based on said photographing condition information of the first image, and wherein said synthesizing step uses auxiliary data concerning shape and position of said first image to synthesize said first image and said second image.

23. An image processing method according to claim 22, wherein said auxiliary data is either an outline with a predetermined size concerning said first image or mask data.

24. An input processing method, comprising:

a first input step of inputting a first image;

a second input step of inputting photographing condition information of the first image;

a third input step of inputting a second image;

a correcting step of correcting said first image and said second image; and a synthesizing step of synthesizing said first image and said second image, wherein said correcting step comprises correcting said first image based on said photographing condition information of the first image, and said synthesizing step comprises synthesizing the first image corrected by said correcting step and said second image, said synthesizing step comprises synthesizing said first image and said second image, and said correcting step comprises correcting the second image synthesized by said synthesizing step based on said photographing condition information of the first image and said second image, and said correcting step comprises correcting gradation and hue of said second image.

* * * * *

UNITED STATES PATENT AND TRADEMARK OFFICE
CERTIFICATE OF CORRECTION

PATENT NO. : 6,987,535 B1
APPLICATION NO. : 09/435774
DATED : January 17, 2006
INVENTOR(S) : Masakazu Matsugu et al.

Figure 2:
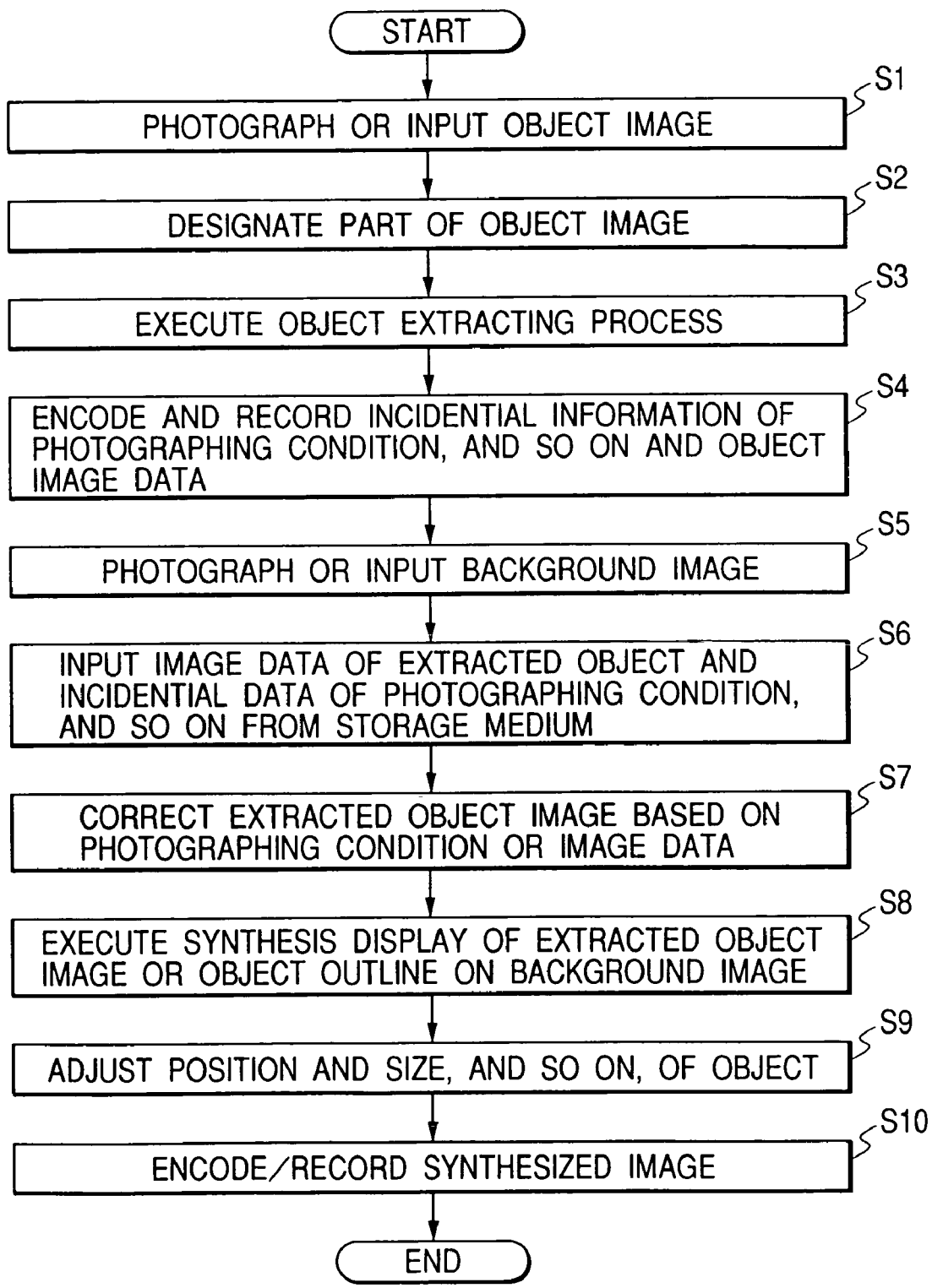
FIG. 2 is a flowchart of an object extracting process and a synthesizing process with a background image.

It is certified that error appears in the above-identified patent and that said Letters Patent is hereby corrected as shown below:

IN THE DRAWINGS
Sheet 2, Figure 2, "INCIDENTIAL" (both occurrences) should read --INCIDENTAL--.
Sheet 5, Figure 5, "INCIDENTIAL" (both occurrences) should read --INCIDENTAL--.
Sheet 18, Figure 18, "INCIDENTIAL" should read --INCIDENTAL--.
Sheet 22, Figure 23, "INCIDENTIAL" should read --INCIDENTAL--.

COLUMN 5
Line 22, "sage" should read --stage--.

COLUMN 6
Line 34, "image)" should read --image--.

COLUMN 16
Line 7, "mophing," should read --morphing--.
Line 20, "mophing" should read --morphing--.

Column 17
Line 7, "of face" should read --of the face--.
Line 36, "anther" should read --another--.

COLUMN 19
Line 54, "can" should read --can be--.

COLUMN 20
Line 20, "image;" should read --image; and--.
Line 28, "image; and" should read --image;--.

COLUMN 21
LINE 7, "claim 4" should read --claim 4,--.
Line 10, "apparatus" should read --apparatus,--.
Line 38, "image," should read --image, and--.
Line 45, "image; and" should read --image;--.

COLUMN 22
Line 24, "claim 10" should read --claim 10,--.

COLUMN 23
Line 11, "image;" should read --image; and--.

UNITED STATES PATENT AND TRADEMARK OFFICE
CERTIFICATE OF CORRECTION

PATENT NO. : 6,987,535 B1
APPLICATION NO. : 09/435774
DATED : January 17, 2006
INVENTOR(S) : Masakazu Matsugu et al.

It is certified that error appears in the above-identified patent and that said Letters Patent is hereby corrected as shown below:

<u>COLUMN 24</u>
Line 55, "image," should read --image, and--.

Signed and Sealed this

Eighteenth Day of July, 2006

JON W. DUDAS
*Director of the United States Patent and Trademark Office*